United States Patent
Akiyama

(10) Patent No.: US 7,498,760 B2
(45) Date of Patent: Mar. 3, 2009

(54) DRIVE CONTROL APPARATUS

(75) Inventor: Shigeki Akiyama, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 171 days.

(21) Appl. No.: 11/527,567

(22) Filed: Sep. 27, 2006

(65) Prior Publication Data

US 2007/0085505 A1 Apr. 19, 2007

(30) Foreign Application Priority Data

Sep. 30, 2005 (JP) ............................ 2005-286459

(51) Int. Cl.
  *G05D 23/275* (2006.01)
(52) U.S. Cl. .................. 318/632; 318/655; 318/609; 318/621
(58) Field of Classification Search ............... 318/560, 318/632, 609, 561, 655, 621; 347/213; 358/497; 400/23
See application file for complete search history.

(56) References Cited

U.S. PATENT DOCUMENTS

| | | | | |
|---|---|---|---|---|
| 4,743,821 A | * | 5/1988 | Hall ........................... | 318/599 |
| 5,073,747 A | * | 12/1991 | Dupraz et al. ............... | 318/561 |
| 5,151,639 A | | 9/1992 | Hasegawa et al. | |
| 6,140,791 A | * | 10/2000 | Zhang ........................ | 318/632 |
| 6,505,085 B1 | * | 1/2003 | Tuttle et al. .................. | 700/28 |
| 6,703,603 B2 | * | 3/2004 | Tohyama et al. ............ | 250/234 |
| 6,831,438 B2 | * | 12/2004 | Jung ........................... | 318/652 |
| 7,336,407 B1 | * | 2/2008 | Adams et al. ............... | 359/211 |
| 7,345,448 B2 | * | 3/2008 | Watt et al. ................... | 318/632 |
| 2003/0102427 A1 | * | 6/2003 | Tohyama et al. ............ | 250/234 |
| 2004/0108828 A1 | * | 6/2004 | Jung ........................... | 318/652 |
| 2004/0135534 A1 | * | 7/2004 | Cullen ........................ | 318/609 |

FOREIGN PATENT DOCUMENTS

| JP | 3233609 | 10/1991 |
|---|---|---|
| JP | 4011365 | 1/1992 |

\* cited by examiner

*Primary Examiner*—Rita Leykin
(74) *Attorney, Agent, or Firm*—Banner & Witcoff, Ltd.

(57) ABSTRACT

A drive control apparatus including a feed-forward operation amount generation device, a feed-back operation amount generation device, a feed-forward correction amount generation device and a feed-forward operation amount correction device is provided. The drive control apparatus is configured to input an input operation amount, which is obtained by adding a feed-back operation amount to a feed-forward operation amount corrected by the feed-forward operation amount correction device, into a control target thereby to drive the control target.

20 Claims, 20 Drawing Sheets

OUTPUT FROM FB CONTROL UNIT (FB COMPENSATION AMOUNT) IN FF CORRECTION VALUE CALCULATION MODE

↓ FILTERING PERFORMED

FB COMPENSATION AMOUNT (OUTPUT FROM FILTER UNIT)

DRIVE CONTROL APPARATUS

CROSS-REFERENCE TO RELATED APPLICATIONS

This application claims the benefit of Japanese Patent Application No. 2005-286459 filed Sep. 30, 2005 in the Japanese Patent Office, the disclosure of which is incorporated herein by reference.

BACKGROUND

The present invention relates to a drive control apparatus that drives a control target by a two-degree-of-freedom system control with a combination of feed-forward control and feed-back control.

There is a known method of driving a control target along a target trajectory, in which feed-forward control and feed-back control are combined to enhance followability and responsiveness. However, this method involves the following problems: Since a reverse model of a transfer function of the control target is required to be performed by a target trajectory generation model, designing may be difficult in case of a complicated control target. Also, an unstable zero may be generated depending on a setting of a sample time in digitization. Further, generation of a nonlinear target trajectory may not be performed.

Accordingly, a control method of a two-degree-of-freedom system is usually used. In this method, an operation amount command is configured to be a simple feed-forward command, and feed-back correction of the feed-forward command is performed based on an actual movement amount (control amount) of the control target.

That is, a difference between a target movement amount and an actual movement amount, which is caused in case of driving a control target based only on a feed-forward operation amount, is compensated by a feed-back compensation amount as an operation amount by feed-back control. This will lead to an improved control performance.

SUMMARY

However, in the two-degree-of-freedom system control as described above, the operation amount by the feed-forward command provided to the control target will not always result in a control amount close to the target trajectory. Specifically, the feed-back compensation amount is likely to be increased due to a nonlinear element (especially a nonlinear property related to friction) or a variety of variables, such as differences in mechanical properties between a control target model intended at the time of designing and an actual control target. Such an increased feed-back compensation amount will impair followability and responsiveness which should be an advantage of feed-forward control.

An explanation will now be provided of impairment of control performance due to an increase of the feed-back compensation amount in the two-degree-of-freedom system control with reference to FIG. 18A to FIG. 21B.

Each of FIGS. 18A to 18C shows a target trajectory for making the control target reach a target destination position. A feed-back operation amount to be provided to the control target is generated based on an acceleration trajectory shown in FIG. 18A.

Also, a target velocity trajectory as shown in FIG. 18B and a target position trajectory as shown in FIG. 18C are generated based on the acceleration trajectory. Then, a feed-back compensation amount for compensating a feed-forward operation amount is obtained based on a comparison result between each of the target trajectories and an actual movement amount of the control target.

By adding the feed-back compensation amount to the feed-forward operation amount, an operation amount to be input to the control target can be obtained. FIG. 19A shows a waveform indicating the operation amount to be input to the control target, while FIG. 19B shows waveforms of the feed-forward operation amount u-ff and the feed-back compensation amount u-fb, respectively, as bases of the operation amount in FIG. 19A. That is, the waveform of FIG. 19A is obtained by adding the waveform of the feed-forward operation amount and the waveform of the feed-back compensation amount shown in FIG. 19B.

Such a two-degree-of-freedom system control may be effective in enhancing responsiveness by feed-forward control while preventing impairment of control performance by combining feed-back control. However, when the variety of variables cause a great influence, the feed-back compensation amount will be increased. In this case, as shown by velocity response waveforms in FIGS. 20A to 20C, a time until the control target reaches a constant velocity state (see FIGS. 20A and 20B) and a time until the control target stops (see FIGS. 20A and 20C) are delayed or deviated from the target velocity trajectory. This means, as shown by position response waveforms in FIGS. 21A and 21B, a time until the control target reaches the target destination position is delayed or deviated from the target position trajectory. This problem will be more significant as the feed-back compensation amount becomes increased.

The feed-forward operation amount is originally obtained based on the control target model intended at the time of designing. Accordingly, if movement properties of the control target model and movement properties of the actual control target are the same, the feed-back compensation amount should be zero in theory. However, the movement properties of the actual control target vary due to the variety of variables, resulting in generation of a certain feed-back compensation amount. As differences between the movement properties of the control target intended at the time of designing and the actual movement properties become greater, the feed-back compensation amount will be increased, which will impair an advantage of feed-forward control.

One aspect of the present invention may achieve enhanced followability and responsiveness in feed-forward control by suppressing an increase in an operation amount by feed-back control regardless of actual movement properties of a control target in a drive control apparatus for driving a control target by a two-degree-of-freedom system control with a combination of feed-forward control and feed-back control, In the one aspect of the present invention, there is provided a drive control apparatus including a feed-forward operation amount generation device, a feed-back operation amount generation device, a feed-forward correction amount generation device and a feed-forward operation amount correction device.

The feed-forward operation amount generation device generates a feed-forward operation amount which corresponds to a target trajectory in order to drive the control target along the target trajectory. The feed-back operation amount generation device compares a target value in accordance with the target trajectory and an actual movement amount of the control target, and generates the feed-back operation amount as an operation amount corresponding to an error between the target value and the actual movement amount so as to minimize the error. The feed-forward correction amount generation device generates a feed-forward correction amount for correcting the feed-forward operation amount so as to minimize the error between the target value and the actual movement amount. The feed-forward operation amount correction device corrects the feed-forward operation amount by adding the feed-forward correction amount to the feed-forward operation amount.

The drive control apparatus is configured to input an input operation amount, which is obtained by adding the feed-back operation amount to the feed-forward operation amount corrected by the feed-forward operation amount correction device, into the control target thereby to drive the control target.

According to the drive control apparatus of the present invention, a feed-forward operation amount intended to minimize an error between the target value and the actual movement amount may be generated. Then, an error between the movement amount and the target trajectory of the control target by using the feed-forward operation amount may be minimized. It may, therefore, be possible to suppress an increase in the operation amount by feed-back control (the feed-back operation amount) and achieve enhanced followability and responsiveness in feed-forward control.

BRIEF DESCRIPTION OF THE DRAWINGS

A preferred embodiment of the present invention will be described hereinafter with reference to the drawings, in which.

DETAILED DESCRIPTION OF THE PREFERRED EMBODIMENT

Figure 1:
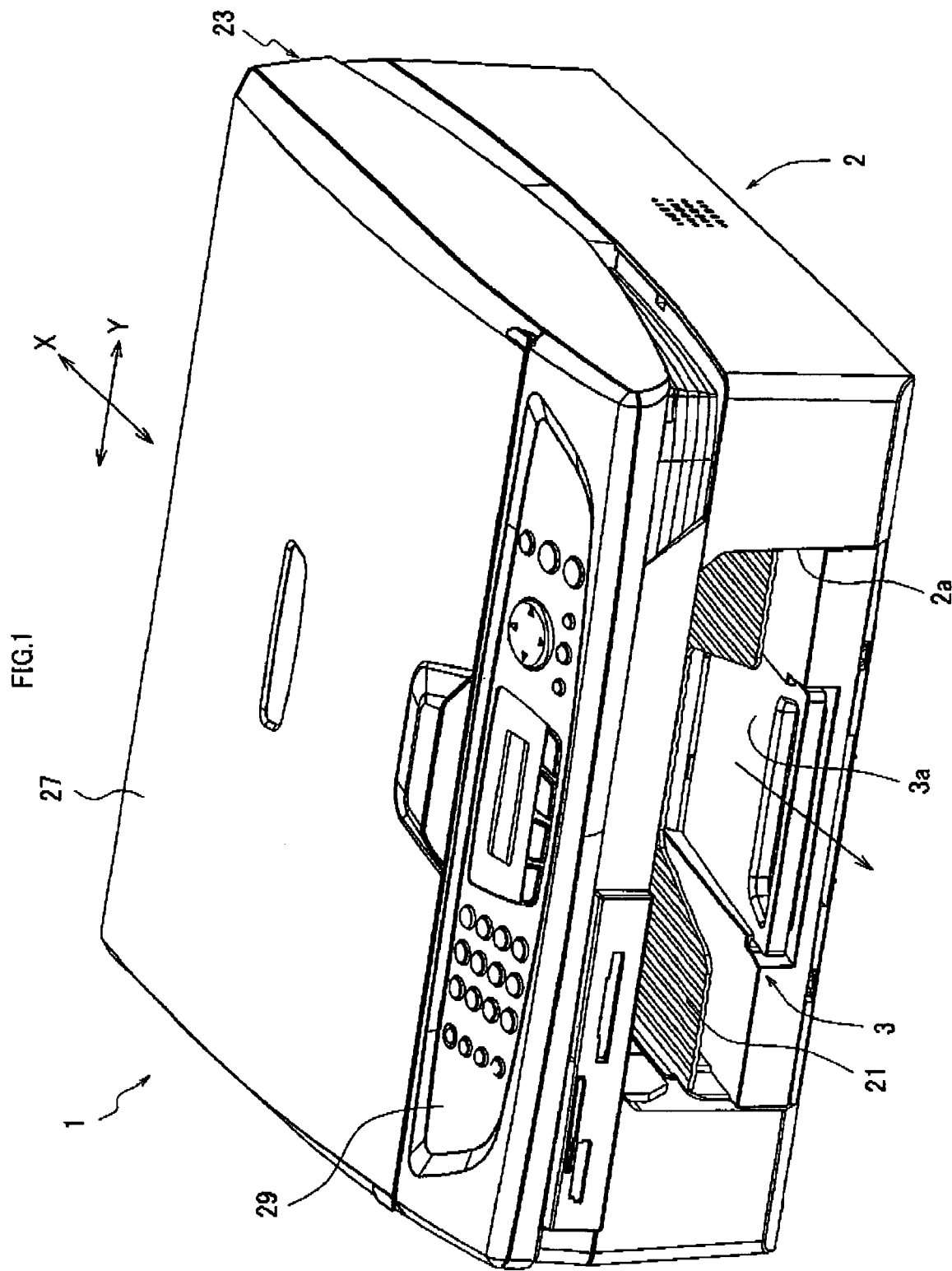
FIG. 1 is a perspective view of a multi-function device of the present embodiment.
Figure 2:
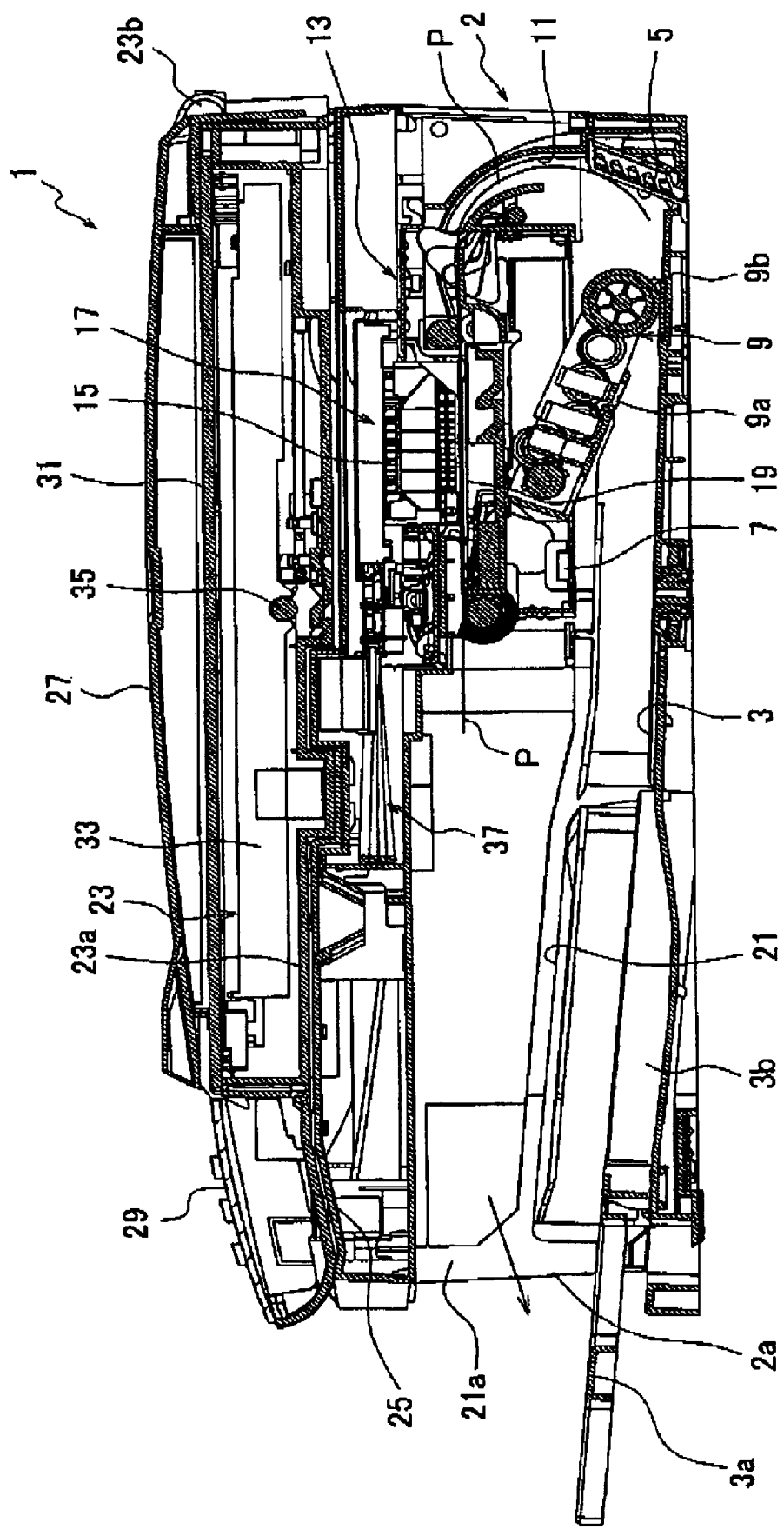
FIG. 2 is a cross-sectional side elevation view of the multi-function device of the present embodiment.

A multi-function device (MFD: Multi-Function Device) 1 in the present embodiment is an apparatus provided with a printer function, a copier function, a scanner function and a facsimile function. As shown in FIG. 1 and FIG. 2, the multi-function device 1 includes a housing 2 made of synthetic resin, and a sheet feed cassette 3. The sheet feed cassette 3 is insertable through an opening 2a formed in a front portion of the housing 2 and is located in a bottom of the housing 2.

The sheet feed cassette 3 is configured so as to contain a plurality of sheets P cut into, for example, A4 size, legal size, etc. A shorter side of each sheet P is arranged in parallel with a direction (the same as a main scanning direction and a Y-axis direction) perpendicular to a sheet feed direction (the same as a sub scanning direction and an X-axis direction).

An auxiliary support member 3a is mounted to a front end of the sheet feed cassette 3 in a movable manner in the X-axis direction so as to support a rear end part of a longer sheet P, for example, in legal size. FIG. 2 shows an example in which the auxiliary support member 3a is extended outwardly from the housing 2. When the sheet P of, for example, A4 size is capable of being contained within the sheet feed cassette 3, the auxiliary support member 3a may be contained in a containing portion 3b so as not to obstruct feeding of the sheet P.

A bank portion 5 for separating sheets is disposed at a back of the sheet feed cassette 3. In the multi-function device 1, a proximal end portion of a sheet feed arm 9a constituting a sheet feed unit 9 is fixed, so as to be upwardly and downwardly pivotable, to a bottom plate of a box-shaped main frame 7 made of metal plates.

A sheet feed roller 9b, which is provided at a distal end portion of the sheet feed arm 9a, and the bank portion 5 separate the sheets P stacked in the sheet feed cassette 3 sheet by sheet and convey the separated sheet P. The separated sheet P is conveyed to an image forming unit 13 provided above (in a higher position than) the sheet feed cassette 3 through a U-turn path 11 constituting a laterally open U-shaped path.

The image forming unit 13 includes a carriage 17 on which the recording head 15 of inkjet type is mounted.

The carriage 17 is reciprocable in a main scanning direction. The carriage 17 is controlled by an after-described CPU 51 that causes the recording head 15 to scan in the main scanning direction. While scanning, the recording head 15 discharges ink to form an image on the sheet P which is stopped and located under the recording head 15. In this case, the sheet P is supported from below by a platen 19 constituting a conveying path. That is, the recording head 15 is located right above the platen 19, and image formation by the recording head 15 on the sheet P is performed on the platen.

The sheet discharge portion 21, to which the sheet P is discharged after image formation by the image forming unit 13, is disposed above the sheet feed cassette 3. A sheet discharge port 21*a* communicating with the sheet discharge portion 21 is opened so as to be integrated with the opening 2*a* in the front portion of the housing 2.

An image scanner 23 to be used for document scanning is disposed over the housing 2. The image scanner 23 includes a bottom wall 23*a* substantially entirely overlapping an upper cover 25. The image scanner 23 is configured so as to be pivotable upwardly and downwardly in an opening and closing manner with respect to one side end of the housing 2 around a not-shown axis. Also, a document cover 27 to cover all over the top surface of the image scanner 23 is attached to a rear end of the image scanner 23 so as to be pivotable upwardly and downwardly around an axis 23*b*.

An operation panel 29 is disposed in a front portion of the image scanner 23. The operation panel 29 includes a variety of operation buttons and a liquid crystal display. A placement glass plate 31 to place a document thereon after upwardly opening the document cover 27 is provided on an upper surface of the image scanner 23. A contact image sensor (CIS: Contact Image Sensor) 33 for document scanning is provided under the placement glass plate 31. The contact image sensor 33 is reciprocable along a guide shaft 35 extending in the main scanning direction (in the Y-axis direction).

A not shown upwardly open ink reservoir portion is provided in a front portion inside the housing 2 covered with the image scanner 23. Four ink cartridges containing inks of four colors (black, cyan, magenta and yellow), respectively, for performing full-color recording are mounted in the ink reservoir portion so as to be attachable and detachable from above. The inks contained in the ink cartridges are supplied to the recording head 15 through a polarity of ink supply tubes 37 connecting the ink cartridges and the recording head 15.

A description of a sheet conveyance system included in the multi-function device 1 will now be provided hereinafter with reference to FIG. 3.

Figure 3:
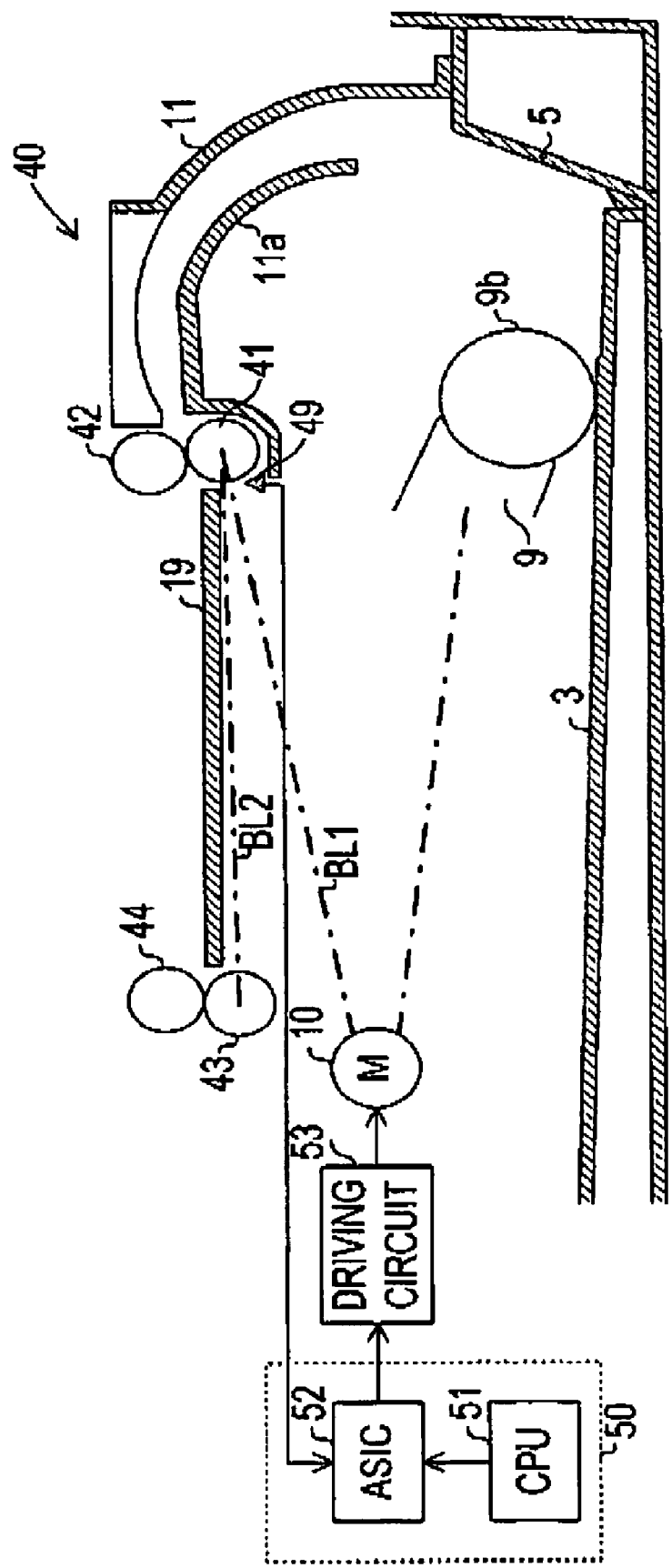
FIG. 3 is an explanatory view showing a schematic structure of a conveyance unit and a conveyance control unit constituting a sheet conveyance system included in the multi-function device.

As shown in FIG. 3, a conveyance unit 40 in the multi-function device 1 includes a sheet feed cassette 3, a sheet feed portion 9, conveyor roller 41, a pinch roller 42, a sheet discharge roller 43, a pinch roller (a spur roller) 44, the bank portion 5, a U-turn path 11, a platen 19, an LF (Line Feed) motor 10, belts BL1 and BL2, and a driving circuit 53.

The sheet feed portion 9 separates sheets P contained in the sheet feed cassette 3 sheet by sheet, and feeds each separated sheet P. The conveyor roller 41 conveys the sheet P fed by the sheet feed roller 9*b* toward and under the recording head 15. The pinch roller 42 is arranged to be opposed to the conveyor roller 41 in a pressed manner. The sheet discharge roller 43 assists sheet conveyance during an image formation, and discharges the sheet P after the image formation to the sheet discharge portion 21. The pinch roller 44 (spur roller) is arranged to be opposed to the sheet discharge roller 43 in a pressed manner.

The bank portion 5, the U-turn path 11, and the platen 19 constitute a conveyance path of the sheet P. The LF motor 10 is a power source of the conveyor roller 41 and the sheet discharge roller 43. The belts BL1 and BL2 transmit forces generated by the motor 10. The driving circuit 53 drives the motor 10 in accordance with a variety of commands (control signals) input from an ASIC (Application Specific Integrated Circuit) 52.

An upstream portion of the conveyance path constituted by the bank portion 5 and the U-turn path 11 is for restricting a movement of the sheet P fed by the sheet feed roller 9*b* thereby to guide the sheet P to a contact area between the conveyor roller 41 and the pinch roller 42. Under a downstream side of the U-turn path 11 in a conveying direction of the sheet P (in a sheet conveying direction), an auxiliary portion 11*a* is provided for restricting a downward movement of the sheet P thereby to guide the sheet P to the contact area between the conveyor roller 41 and the pinch roller 42.

Accordingly, the sheet P fed by the sheet feed cassette 3 is guided to the contact area between the conveyor roller 41 and the pinch roller 42 by the bank portion 5, the U-turn path 11 and the auxiliary portion 11*a*. When the conveyor roller 41 rotates forwardly in the sheet conveying direction (rotates in a counter-clockwise direction in FIG. 3), the sheet P is pulled between the conveyor roller 41 and the pinch roller 42 and is held by the conveyor roller 41 and the pinch roller 42. Subsequently, the sheet P is conveyed in accordance with a rotation of the conveyor roller 41 toward the sheet discharge roller 43 in the sheet conveying direction by a distance corresponding to a rotation amount of the conveyor roller 41.

The platen 19 constitutes a downstream portion of the conveyance path connecting the conveyor roller 41 and the sheet discharge roller 43. The platen 19 is provided between the conveyor roller 41 and the sheet discharge roller 43 along a line connecting these rollers. The platen 19 guides the sheet P fed by the conveyor roller 41 toward an area, in which image formation is performed by the recording head 15, and also guides the sheet P with an image formed thereon by the recording head 16 toward a contact area between the sheet discharge roller 48 and the pinch roller 44.

The motor 10, which is constituted by a DC motor, is driven by the driving circuit 53 and transmits a rotational force to the conveyor roller 41 through the belt BL1 wound around the motor 10 and the conveyor roller 41. As a result, the conveyor roller 41 is rotated. The rotational force transmitted to the conveyor roller 41 is further transmitted to the sheet discharge roller 43 through the belt BL2 wound around the conveyor roller 41 and the sheet discharge roller 48. As a result, the sheet discharge roller 43 is rotated simultaneously with the conveyor roller 41 in the same direction.

Further, the rotational force generated by the motor 10 is transmitted to the sheet feed roller 9*b* through a not-shown transmission mechanism, causing a rotation of the sheet feed roller 9*b*. However, the sheet feed roller 9*b* rotates in the conveying direction of the sheet P thereby to feed the sheet P toward the conveyor roller 41 only during a sheet feed process. The sheet feed roller 9*b* idles without receiving the rotational force from the motor 10 during an image formation process. That is, the transmission mechanism connecting the sheet feed roller 9*b* and the motor 10 is designed to transmit the rotational force to the sheet feed roller 9*b* only during the sheet feed process and not to transmit the rotational force to the sheet feed roller 9*b* during the image formation process by separating a built-in gear.

When the sheet feed roller 9*b* rotates in the sheet conveying direction, the conveyor roller 41 and the sheet discharge roller 43 rotate in a reverse direction to the sheet conveying direction. Specifically, when the motor 10 rotates forwardly, the transmission mechanism connecting the sheet feed roller 9*b* and the motor 10 does not transmit the rotational force to the sheet feed roller 9*b*. When the motor 10 rotates reversely, the transmission mechanism converts the rotational force into a forward rotational force by the built-in gear and transmits the forward rotational force to the sheet feed roller 9*b*.

The sheet feed process here means a process in which the sheet feed roller 9b is rotated while being pressed against an uppermost sheet P among sheets P placed on the sheet feed cassette 3 in a stacked manner thereby to convey a front end of the sheet P to a register position, which is substantially the contact area between the conveyor roller 41 and the pinch roller 42.

The conveyance unit 40 includes a rotary encoder 49 which outputs a pulse signal each time the conveyor roller 41 rotates by a predetermined amount. The pulse signal output by the rotary encoder 49 is input to the ASIC 62 in a conveyance control unit 50. In the present embodiment, the conveyor roller 41 and the sheet discharge roller 43 are rotated by the motor 10, and a rotation of the motor 10 is also transmitted to the sheet feed roller 9b. Accordingly, by detecting and counting pulse signals from the rotary encoder 49, it is possible to determine rotation amounts of the motor 10, the conveyor roller 41, the sheet discharge roller 43 and the sheet feed roller 9b as well as moving distances (conveying distances) of the sheet P conveyed by the conveyor roller 41, the sheet discharge roller 43 and the sheet feed roller 9b, respectively, in the multi-function device 1.

Sheet conveyance during the image formation process is performed by sequentially feeding the sheet P each time by a predetermined amount in the sub scanning direction (in the sheet conveying direction). Specifically, when recording for one path is performed in the main scanning direction by the recording head 15 which is reciprocable, the sheet P is fed by the predetermined amount in the sub scanning direction and is stopped for recording for a next path. Then, recording for the next path in the main scanning direction by the recording head 15 is performed. When recording for the next path is completed, the sheet P is fed by the predetermined amount in the sub scanning direction and is stopped for recording for a further next path, and then recording for the further next path in the main scanning direction by the recording head 15 is performed. That is, feeding of the sheet P by the predetermined amount in the sub scanning direction is sequentially repeated until recording on the sheet P is completed.

The conveyance control unit 50 connected to the driving circuit 53 of the conveyance unit 40 inputs commands (e.g., a PWM signal) to the driving circuit 53. The commands are directed to the motor 10. Thus, the conveyance control unit 50 controls the rotation of the motor 10 constituting the conveyance unit 40, and thereby indirectly controls sheet conveyance by the sheet feed roller 9b, the conveyor roller 41 and the sheet discharge roller 43. The conveyance control unit 50 is mainly constituted by the CPU 51 that comprehensively controls the multi-function device 1 and the ASIC 62 that controls a rotation velocity, a rotation direction, and the like of the motor 10.

Figure 4:
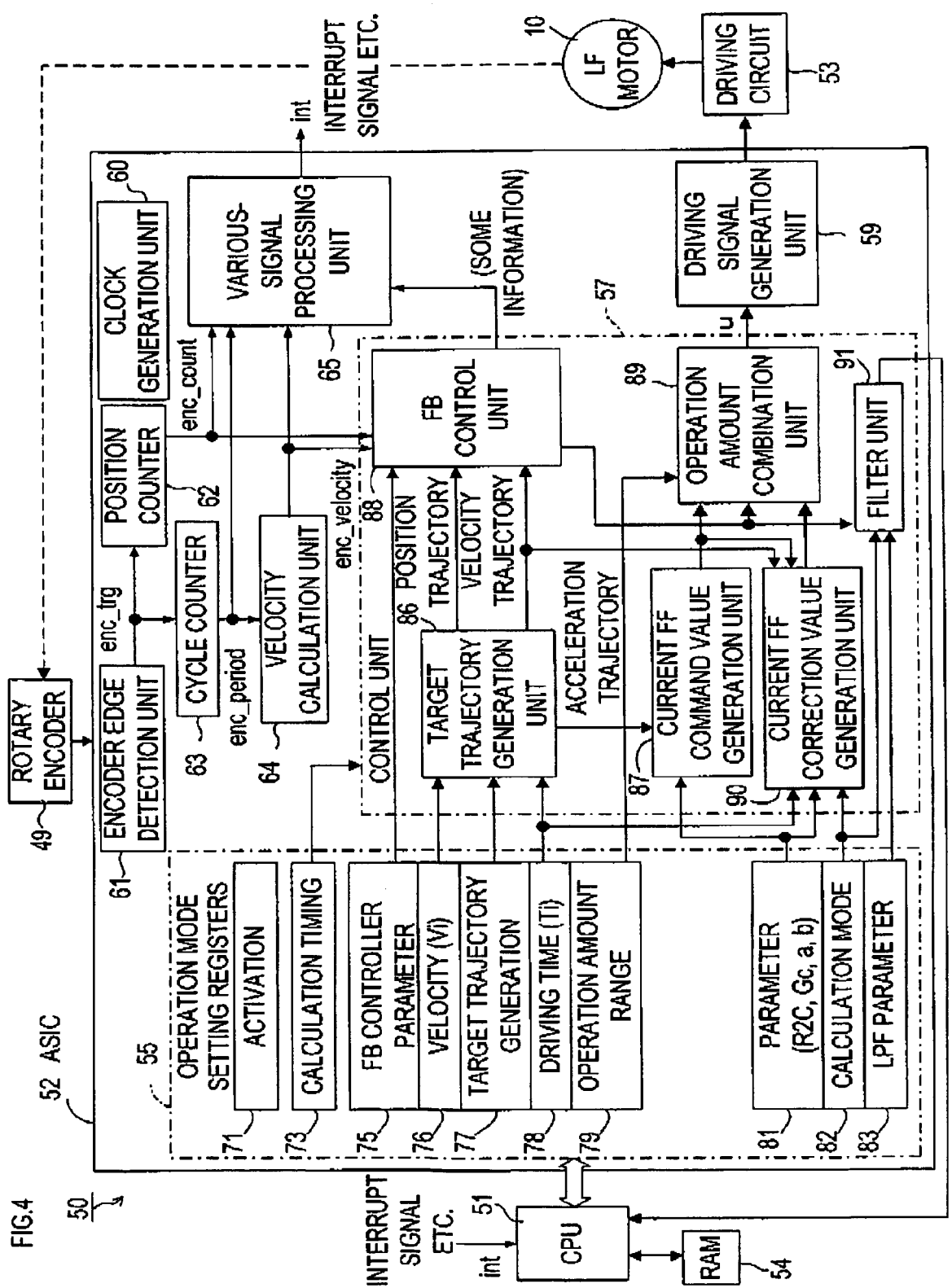
FIG. 4 is a block diagram showing a configuration of the conveyance control unit.

FIG. 4 shows a configuration of the conveyance control unit 50. Since a description below is focused on a control when the sheet P is conveyed in the image formation process and a calculation of parameters (particularly parameters for generating an after-mentioned current feed-forward correction value) to be used for the control, only components necessary for the motor control in the image formation process and the calculation of the parameters are shown in FIG. 4.

The conveyance control unit 50 generates a PWM signal for controlling the rotation velocity, the rotation direction, and the like of the motor 10 and outputs the PWM signal to the driving circuit 53. The driving circuit 53 includes a known H bridge circuit provided with four switching elements (elements constituted by, for example, FET: Field Effect Transistor) and flywheel diodes connected in parallel with the switching elements, respectively. By turning ON/OFF the switching elements in response to a driving signal (a PWM signal) from an outside, a current supply to the motor 10 is controlled.

The CPU 51 performs writing or reading of calculation data to or from the RAM 54 when needed. The CPU 51 also includes a not-shown EEPROM, which is a volatile memory, and stores a variety of parameters obtained by a variety of calculation in the EEPROM.

The ASIC 52 includes a group of operation mode setting registers 55 that store a variety of control parameters necessary for drive control of the motor 10 by an operation of the CPU 51. The group of operation mode setting registers 55 include an activation register (an activation setting register) 71, a calculation timing register (a calculation timing setting register) 73, an FB parameter register (a feed-back controller parameter setting register) 75, a velocity register (a velocity setting register for constant velocity driving) 76, a driving time register (a driving time setting register) 78, a target trajectory register (a target trajectory generation unit parameter setting register) 77, an operation amount range register (an operation amount range setting register) 79, an FF parameter register (a feed-forward controller parameter setting register) 81, a calculation mode register (a feed-forward correction value calculation mode setting register) 82, and an LPF parameter register (an LPF parameter setting register) 83. Set values are written to the respective setting registers by the CPU 51.

The activation register 71 is for activating the motor 10. The calculation timing register 73 is for setting a calculation timing at which a control unit 57 calculates an operation amount u for controlling the motor 10.

The FB parameter register 75 is for setting a variety of control parameters to be used for generating an after-mentioned feed-back compensation amount by a feed-back (FB) control unit 88 in the control unit 57. The velocity register 76 is for setting a velocity Vi for constant velocity driving to be used for generating a variety of target trajectories by a target trajectory generation unit 86 in the control unit 57. The driving time register 78 is for setting a driving time Ti to be used for generating the variety of target trajectories by the target trajectory generation unit 86. The target trajectory register 77 is for setting parameters in a function to be used for generating a variety of target trajectories based on the velocity Vi for constant velocity driving and the driving time Ti by the target trajectory generation unit 86. The operation amount range register 79 is for setting a maximum value and a minimum value of the operation amount u calculated by the control unit 57.

The FF parameter register 81 is for setting a current conversion coefficient R2C, an FF correction coefficient (a current feed-forward value correction coefficient) Gc, a first parameter (a first friction compensation parameter) a and a second parameter (a second friction compensation parameter) b. Here, the current conversion coefficient R2C is used for generating a current feed-forward command value by an FF command generation unit (a current feed-forward command value generation unit) 87, and the FF correction coefficient Gc, the first parameter a and the second parameter b are used for generating a current feed-forward correction value by an FF correction value generation unit (a current feed-forward correction value generation unit) 90.

The calculation mode register 82 is for setting the conveyance control unit 50 in a feed-forward correction value calculation mode in which the FF correction coefficient Gc, the first parameter a and the second parameter b are calculated. The LPF parameter register 83 is for setting a variety of parameters to be used for performing filtering (i.e., cutting a high-frequency component from the feed-back compensation amount) by a filter unit 91 in the control unit 57.

Figure 18A:
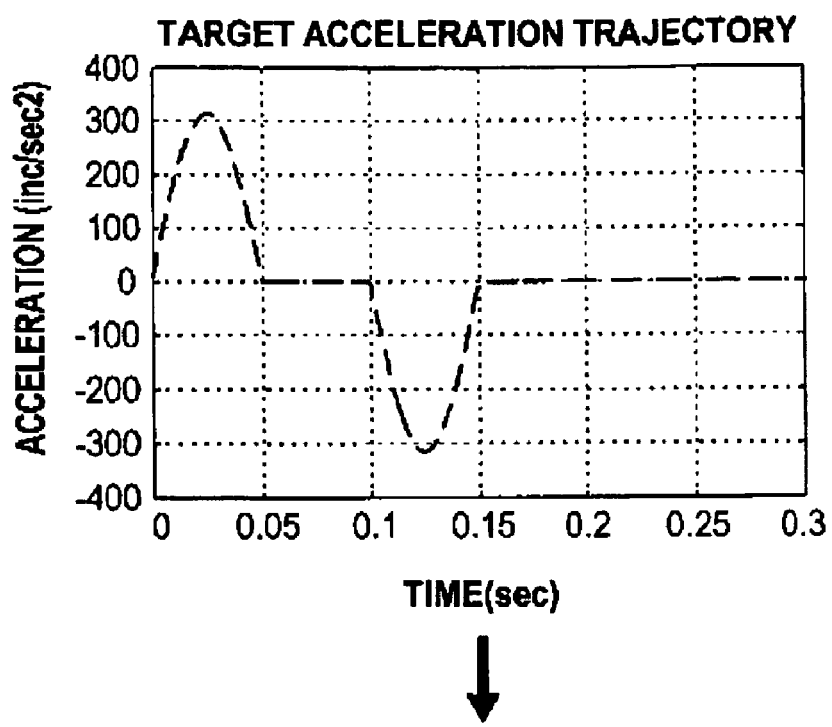
FIGS. 18A, 18B and 18C are graphs showing a target acceleration trajectory, a target velocity trajectory and a target position trajectory, respectively.
Figure 18B:
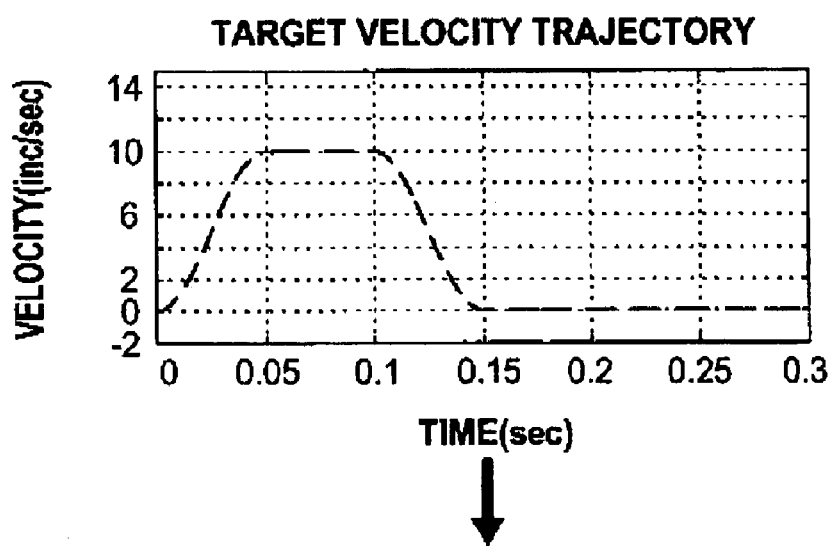
Figure 18C:
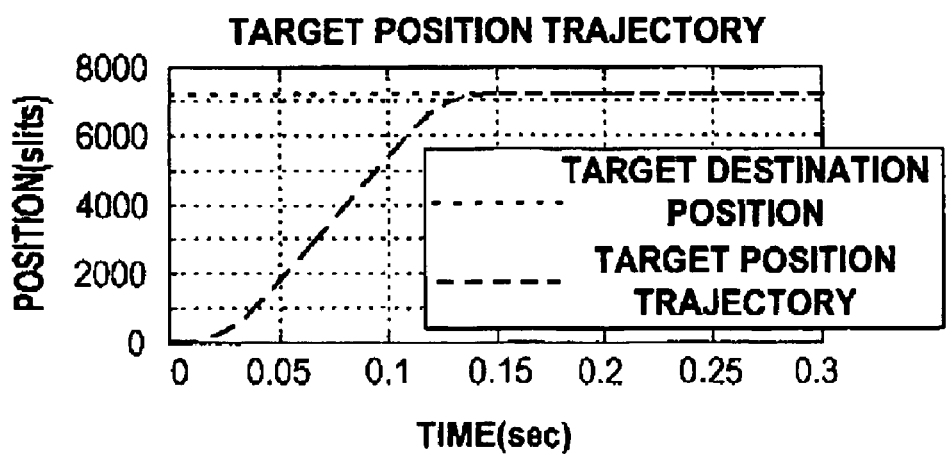

The velocity Vi for constant velocity driving means a velocity during a constant velocity driving in a conveyance operation of conveying the sheet P each time by one path. In the conveyance operation of the present embodiment, the motor 10 in a stopped state is gradually accelerated up to a specified velocity (i.e., the above-mentioned velocity Vi for constant velocity driving). Then, a constant velocity driving is performed at the specified velocity for a specified time period. Subsequently, the motor 10 is gradually decelerated and is stopped at a predetermined target destination position. That is, driving of the motor in accordance with a trajectory shown in FIGS. 18A to 18C is repeated in each conveyance by one path.

The driving time Ti includes an acceleration driving time, a constant velocity driving time and a deceleration driving time. Accordingly, these driving times are set in the driving time register 78.

The ASIC 52 also includes, in addition to the group of operation mode setting registers 55, a clock generation unit 60, an encoder edge detection unit 61, a position counter 62, a cycle counter 63, a velocity calculation unit 64, the control unit 57 a driving signal generation unit 69 and a various-signal processing unit 65.

The clock generation unit 60 generates a clock signal having a cycle sufficiently shorter than a cycle of each of an encoder phase A signal encA and an encoder phase B signal encB from the rotary encoder 49 and provides the clock signal to various units in the ASIC 52. The encoder edge detection unit 61, the position counter 62, the cycle counter 63 and the velocity calculation unit 64 are for detecting a position and a moving velocity of the conveyor roller 41 (and thus a position and a moving velocity of the sheet P) based on the encoder signals encA and encB from the rotary encoder 49.

The control unit 57 calculates the operation amount u (a PWM duty ratio) based on detection results by the above mentioned units and the parameters set in the group of operation mode setting registers 55. The driving signal generation unit 59 generates a PWM signal for duty driving of the motor 10 based on the operation amount u calculated by the control unit 57, and outputs the PWM signal to the driving circuit 53. The various-signal processing unit 65 processes various signals generated in the ASIC 52, and outputs the processed signals to the CPU 51.

Figure 5:
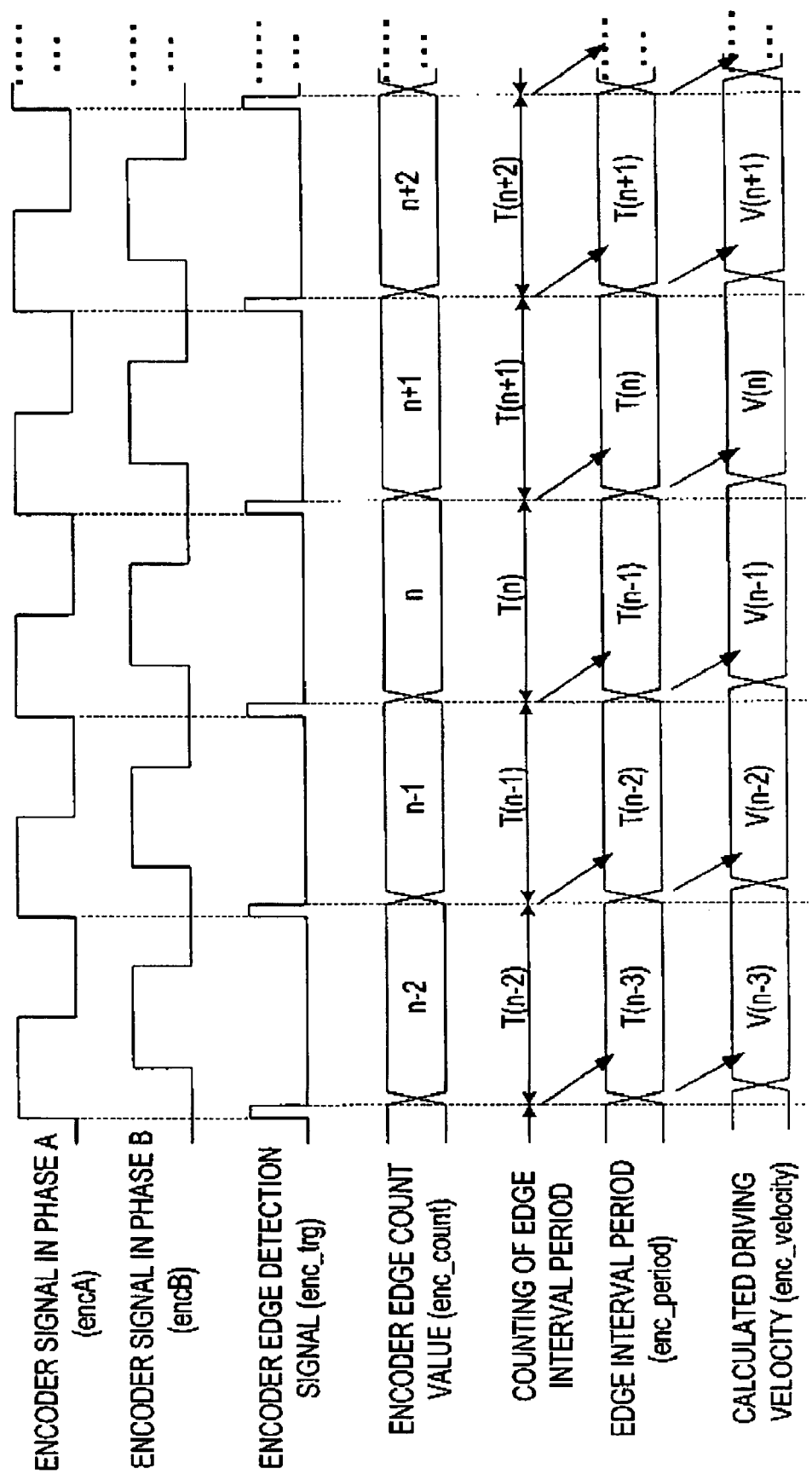
FIG. 5 is an explanatory view for illustrating an operation of an encoder and a signal processing circuit of the encoder.

The rotary encoder 49 is for detecting the rotation of the conveyor roller 41 driven by the motor 10 as mentioned above. The rotary encoder 49 outputs two types of pulse signals (an encoder phase A signal encA, an encoder phase B signal encB) which are shifted by a predetermined cycle with each other (¼ cycle in the present embodiment) in accordance with the conveyance operation of the sheet P, as shown in FIG. 5. The encoder phase A signal encA and the encoder phase B signal encB are such that the signal encA leads in phase by the predetermined cycle relative to the signal encB when the rotational direction of the conveyor roller 41 is a direction of conveying the sheet P, while the signal encA delays in phase by the predetermined cycle relative to the signal encB when the rotational direction is opposite.

The encoder edge detection unit 61 receives the encoder signals encA and encB, and detects edges (in the present embodiment an edge of encA when encB is in a low level) indicating a start/an end of each cycle of the signal encA and the rotational direction of the motor 10. The encoder edge detection unit 61 outputs an encoder edge detection signal (enc_trg) to the position counter 62 and a cycle counter 63.

The position counter 62 counts up or down a count value (enc_count) by the encoder edge detection signal (enc_trg) in accordance with the rotational direction of the motor 10 (i.e., the feed direction of the sheet P) detected by the encoder edge detection unit 61, thereby to determine a conveyance amount (position) of the sheet P by each path, and the count value (enc_count) is output to the control unit 57 and the various-signal processing unit 65.

The cycle counter 63 is initialized each time an encoder edge detection signal (enc_trg) is input from the encoder edge detection unit 61, and times an elapsed time since the edge detection signal is input by counting a clock signal CK. An edge interval period (enc_period) indicating a timing result of the elapsed time is output to the control unit 57 and the velocity calculation unit 64.

The velocity calculation unit 64 calculates, in synchronization with the encoder edge detection signal (enc_trg), a rotation velocity of the conveyor roller 41 (detected velocity: enc_velocity (=reso/enc_period)) based on a physical resolution (reso) of the rotary encoder 49 and a retention value Cn−1 of the edge interval period (enc_period) counted by the cycle counter 63 in a previous cycle of the signal encA.

The control unit 57 includes the target trajectory generation unit 86, the FF command generation unit 87, the FE correction value generation unit 90, the feed-back control unit 88, an operation amount combination unit 89, and the filter unit 91.

Figure 6:
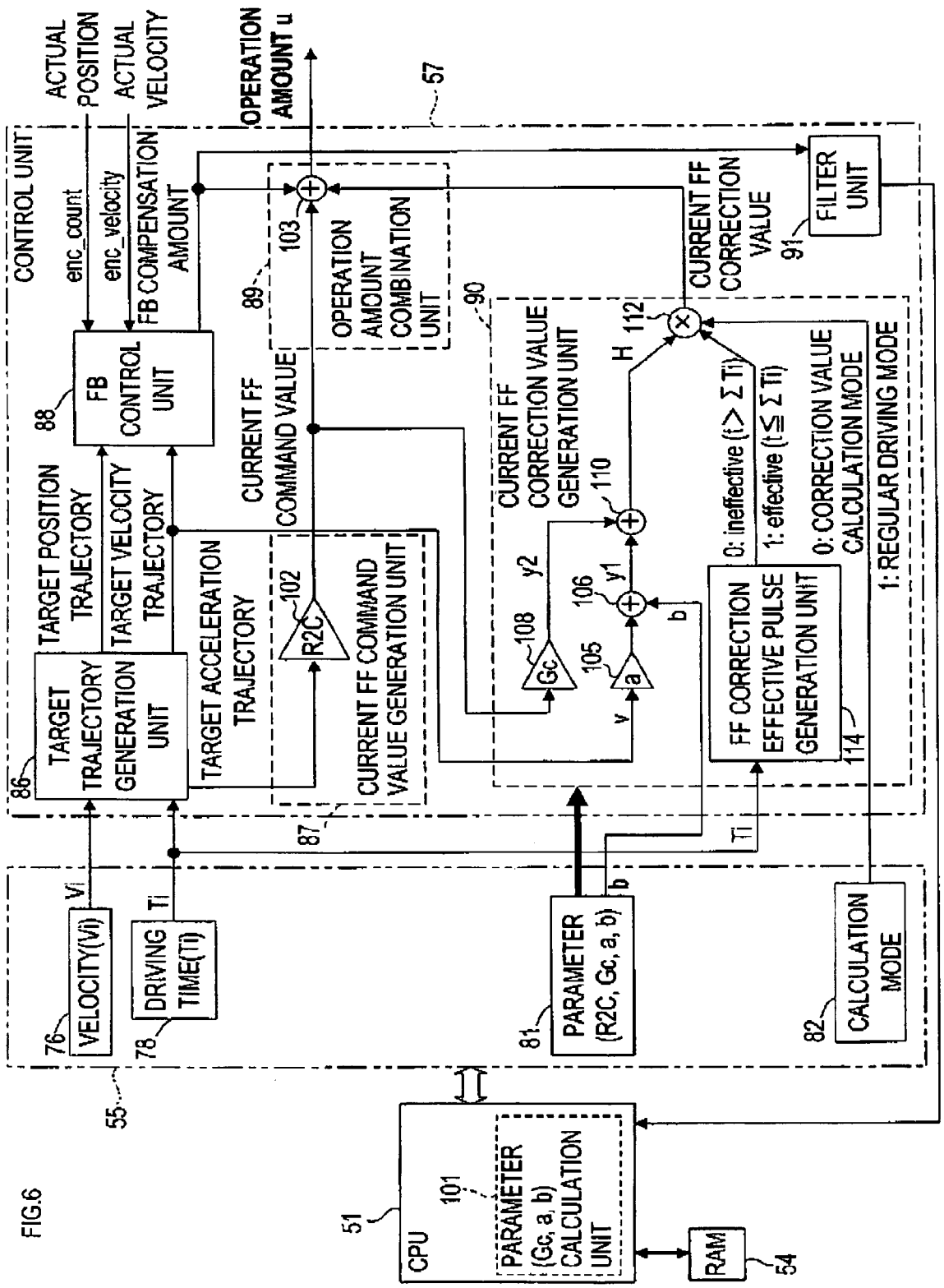
FIG. 6 is a block diagram showing a detailed configuration of a portion involved in generation of a current feed-forward correction value in the conveyance control unit.

A detailed description of an operation of the control unit 57 will now be provided using FIG. 6.

The target trajectory generation unit 86 generates a target trajectory based on the velocity Vi for constant velocity driving set in the velocity register 76 and the driving time Ti (an acceleration time T1, a constant velocity time T2 and a deceleration time T3) set in the driving time register 78. Specifically, as shown in FIG. 18, an acceleration trajectory is generated, and a target velocity trajectory is generated by integrating the acceleration trajectory, and then a target position trajectory is generated by integrating the target velocity trajectory.

The FF command generation unit 87 generates, in a current value converter 102 provided therein, a current feed-forward command value by multiplying the acceleration trajectory output from the target trajectory generation unit 86 by the current conversion coefficient R2C. The acceleration trajectory output from the target trajectory generation unit 86 corresponds to a target torque command to be provided to the motor 10. By multiplying the target torque command by the current conversion coefficient R2C to be converted into a current value, the current feed-forward command value as an operation amount by feed-forward control is generated and is output to the operation amount combination unit 89.

The feed-back control unit 88 retrieves an actual position of a control target (enc_count) and an actual velocity (enc_velocity), and compares the actual position and the actual velocity with the target position trajectory and the target velocity trajectory generated in the target trajectory generation unit 86. Based on a result of the comparison, the feed-back control unit 88 calculates an operation amount, which leads to a smaller error between the actual position and a target position, and a smaller error between the actual velocity and a target velocity. The feed-back control unit 88 then outputs the calculated operation amount to the operation amount combination unit 89 and the filter unit 91 as a feed-back compensation amount to compensate the current feed-forward command value.

The operation amount combination unit 89, which is provided with a third adder 103 therein, adds the current feed-forward command value from the FF command generation unit 87, the feed-back compensation amount from the feed-back control unit 88 and the current feed-forward correction value (later described in detail). The operation amount combination unit 89 then outputs a result of the addition as the operation amount u to the driving signal generation unit 59.

The FF correction value generation unit 90 generates a current feed-forward correction value to correct the current feed-forward command value. The current feed-forward command value from the FF command generation unit 87 is merely a command value (a feed-forward operation amount) that makes a control target (a nominal model) expected at the time of designing the conveyance control unit 50 operate as intended. However, a model of an actual control target is usually different in mechanical parameters, to a certain extent, from the nominal model expected at the time of designing. Also, a friction will act on the control target, and the friction will differ in size and type depending on individual control targets. Errors in mechanical parameters of the control target and the friction acting on the control target will cause an actual movement amount of the control target to be different from the target trajectory.

Accordingly, to compensate for a difference from the target trajectory due to errors in mechanical parameters and friction, feed-back control by the feed-back control unit 88 is performed, and feed-back compensation amount is generated to correct the current feed-forward command value thereby to compensate the current feed-forward command value.

As described above, however, as the errors in mechanical parameters between the control target expected at the designing and the actual control target become larger, the feed-back compensation amount to compensate the errors will also be larger. This leads to deterioration in followability and responsiveness which should be an advantage of feed-forward control.

Accordingly, in the present embodiment, an operation amount to compensate the errors in mechanical parameters and an operation amount to compensate the friction are generated in the FF correction value generation unit 90. Then, a combination of these operation amounts as the current feed-forward correction value is added to the current feed-forward command value (actually input to the operation amount combination unit 89) thereby to correct the current feed-forward command value. By this, the corrected current feed-forward command value reflects actual mechanical properties of the control target and the friction acting on the control target. Thus, an increase in the feed-back compensation amount can be suppressed.

"Actual mechanical properties" (a variety of properties other than friction) here mean a variety of properties affecting dynamic characteristics of the control target, such as a dimension, a shape and a hardness of the control target.

In the FF correction value generation unit 90, a friction correction amount y1 and a parameter correction amount y2 are generated. The friction correction amount y1 is used to correct the current feed-forward command value, in order to suppress occurrence of an error (a friction error) between the target trajectory (the target position trajectory, the target velocity trajectory) and an actual movement amount (an actual position, an actual velocity) mainly due to the friction on the control target. The parameter correction amount y2 is used to correct the current feed-forward command value, in order to suppress occurrence of an error (a property changing error) between the target trajectory and the actual movement amount due to the errors in mechanical parameters.

The friction error includes a viscous friction error due to a viscous friction depending on a driven velocity of the control target, and a dynamic friction error due to a dynamic friction (a coulomb friction) not depending on the driven velocity of the control target.

Referring to the generation of the friction correction amount y1, as shown in FIG. 6, a current feed-forward command value v and the first parameter a are multiplied in a viscous friction correction amount calculator 105 provided in the FF correction value generation unit 90 to obtain a viscous friction correction amount. The viscous friction correction amount is used to suppress occurrence of the viscous friction error.

The viscous friction correction amount calculated in the viscous friction correction amount calculator 105 is added with a second parameter b in a first adder 106. The second parameter b is used to suppress occurrence of the dynamic friction error. Thus, the friction correction amount y1 is obtained as a sum of the viscous friction correction amount (a product of a and v) and the second parameter b.

The current feed-forward command value is multiplied by the FF correction coefficient Gc (property correction coefficient) in a parameter correction amount calculator 108 provided in the FF correction value generation unit 90. Thus, the parameter correction value y2 is obtained. Then, the friction correction amount y1 and the parameter correction value y2 are added in a second adder 110 to obtain an output correction value H.

The output correction value H is multiplied by a pulse from an effective pulse generation unit (a feed-forward correction effective pulse generation unit) 114 in a multiplier 112. In the present embodiment, a pulse of High level ("1") indicating effectiveness is output from the effective pulse generation unit 114 to the multiplier 112 during a period from when the sheet conveyance for one path is started until the sheet conveyance is stopped. The period corresponds to a total of the driving time Ti set in the driving time register 78. When the sheet conveyance is stopped, a pulse of Low level ("0") indicating ineffectiveness is output to the multiplier 112.

A value set in the calculation mode register 82, which is also input to the multiplier 112, is "1" during a regular sheet conveyance operation (in a regular driving mode). Accordingly, the output correction value H is output without change from the multiplier 112 during the regular sheet conveyance operation, and is input to the operation amount combination unit 89 as the current feed-forward correction value.

The current feed-forward correction value (i.e., the output correction value H) is obtained by adding the friction correction amount y1 to suppress occurrence of a control error due to the friction acting on the control target and the parameter correction value y2 to suppress occurrence of a control error due to an error in mechanical parameters of the control target. Accordingly, the current feed-forward command value from the FF command generation unit 87 will be corrected to a value adjusted to an actual state of the control target (i.e., friction, mechanical parameters) by an addition of the current feed-forward correction value.

Figure 7A:
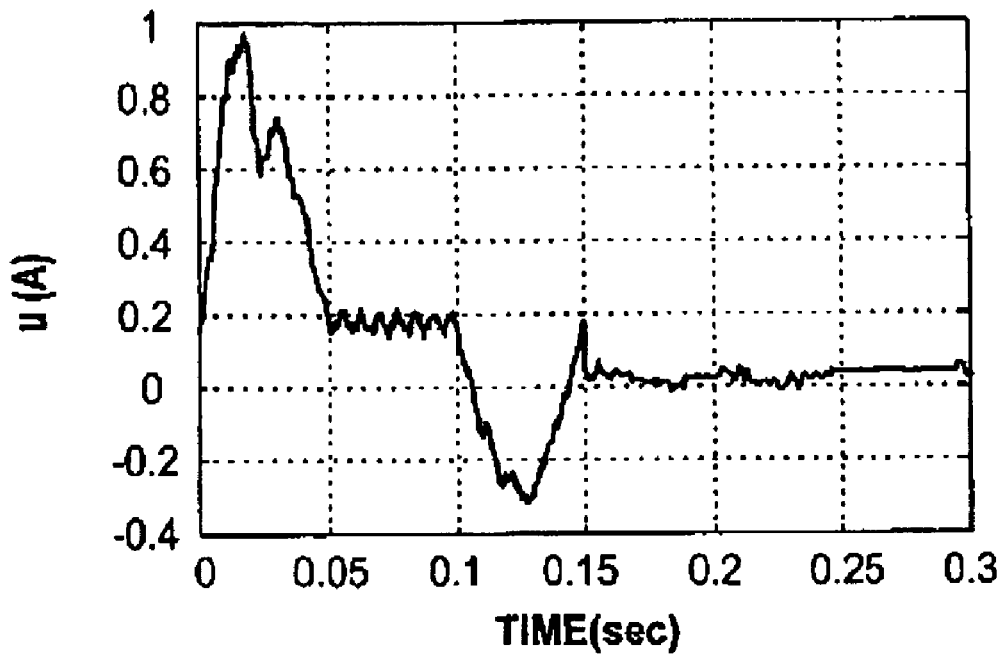
FIGS. 7A and 7B are graphs showing waveforms of an operation amount generated by a control unit of the present embodiment.
Figure 7B:
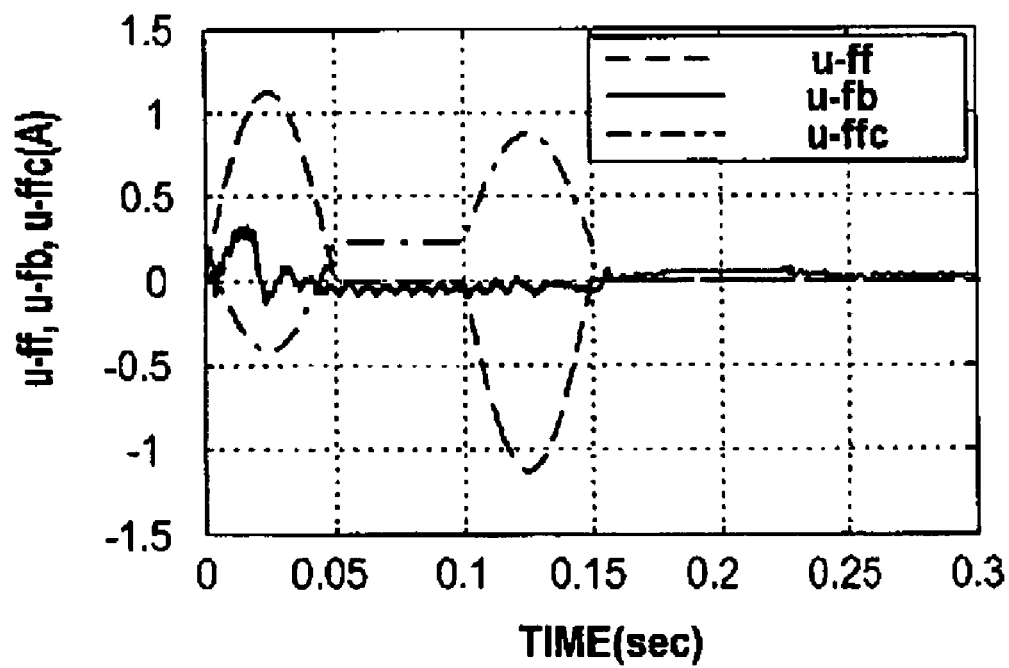

FIGS. 7A and 7B show waveforms of the operation amount u for one path when the sheet conveyance is performed by driving the motor 10 (and thus by driving the conveyor roller 41) based on the operation amount u generated in the control unit 57.

Figure 19A:
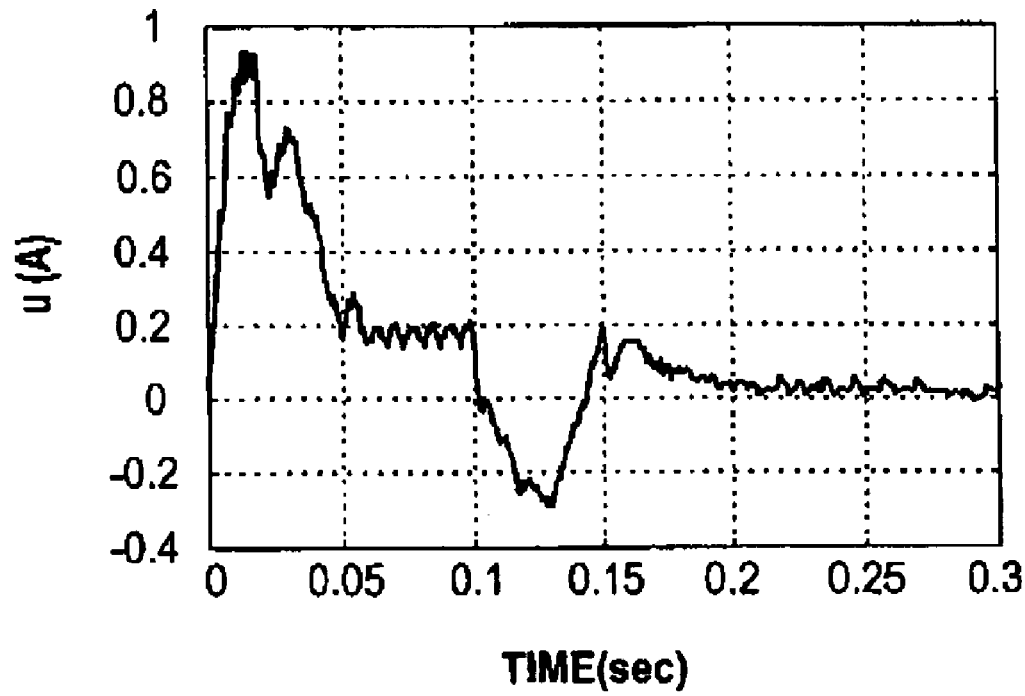
FIGS. 19A and 19B are graphs showing waveforms of an operation amount generated by a conventional two-degree-of-freedom system control.

As clearly shown by a comparison of FIG. 7A and FIG. 19A in a conventional case, the operation amount in the acceleration period has smaller amounts of changes and is relatively stable in the case of FIG. 7A. Also, in a stopping time (Time: 0.15 sec. and later), the operation amount promptly reaches the vicinity of zero in FIG. 7A, while the operation amount does not promptly reach the vicinity of zero but gradually declines in FIG. 19A.

Figure 19B:
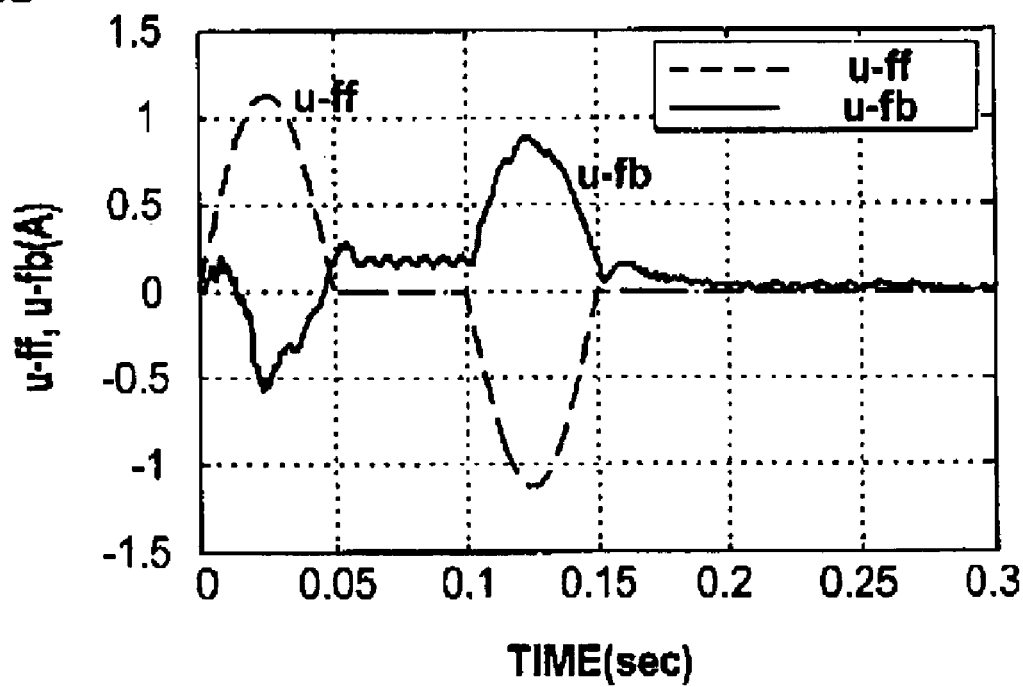
Figure 20A:
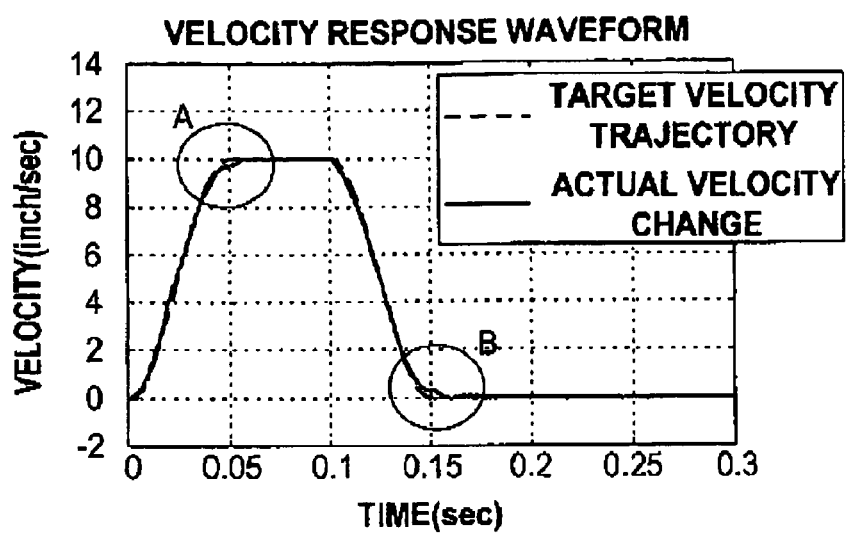
FIGS. 20A, 20B and 20C are graphs showing a velocity response when the operation amount in FIG. 19A is given to the control target.
Figure 20B:
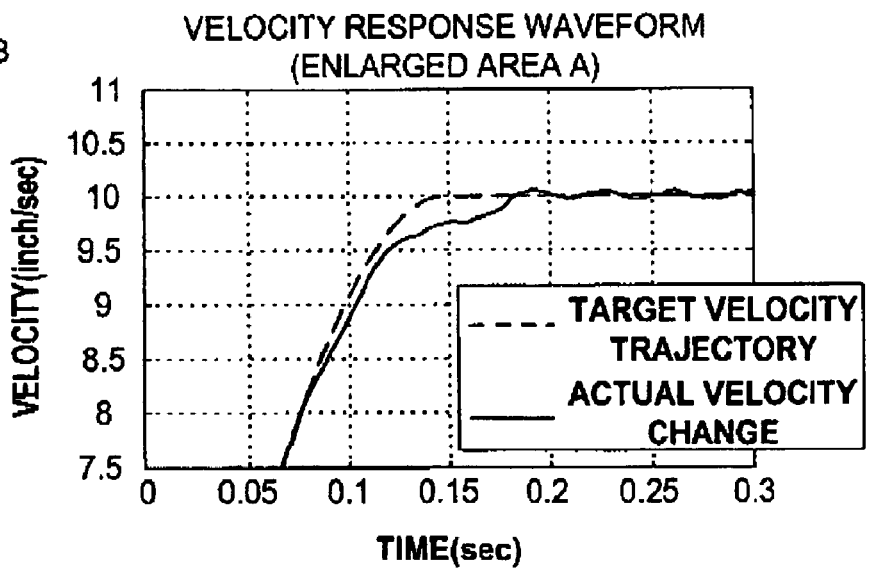
Figure 20C:
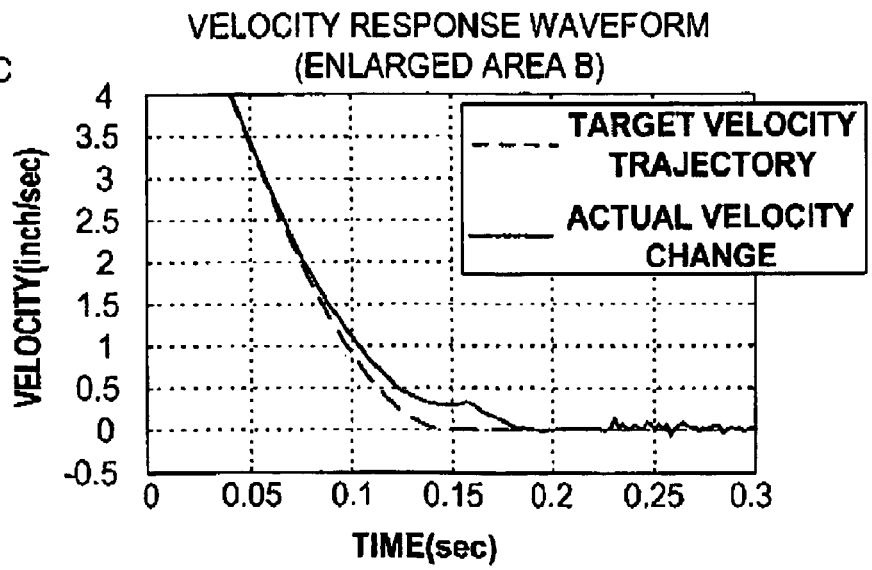

In FIG. 7B, the operation amount in FIG. 7A is divided into the current feed-forward command value u-ff, the feed-back compensation amount u-fb, and the current feed-forward correction value u-ffc. As shown in FIG. 7B, the current feed-forward command value from the FF command generation unit 87 is corrected by the current feed-forward correction value. Thus, the feed-back compensation amount from the feed-back control unit 88 is considerably reduced in the present embodiment as compared with the conventional case in FIG. 19B.

In FIG. 7A, the feed-back compensation amount generated to a certain extent at a start of the acceleration period is to compensate for nonlinearity during a transition from a static friction to a dynamic friction at a time of activation, a characteristic of unstable rotation until the motor 10 reaches a certain velocity, and the like. Once the motor 10 reaches the certain velocity, the feed-back compensation amount remains in the vicinity of zero.

Figure 8A:
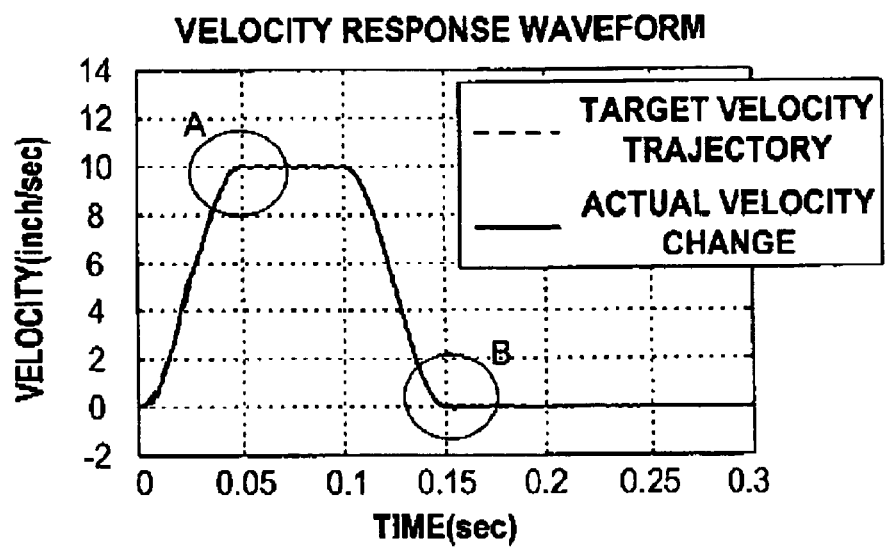
FIGS. 8A, 8B and 8C are graphs showing a velocity response when the operation amount in FIG. 7A is given to a control target.
Figure 8B:
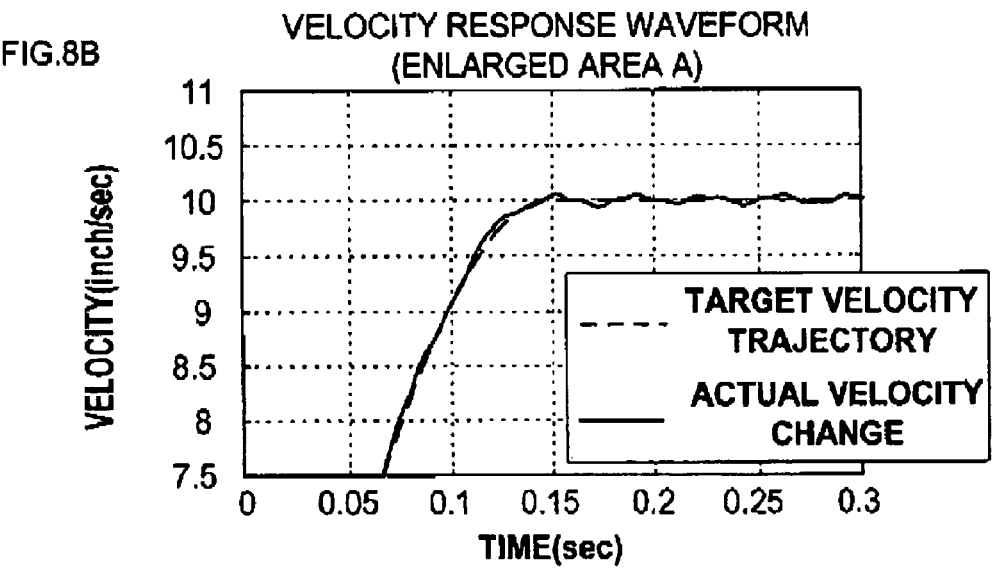
Figure 8C:
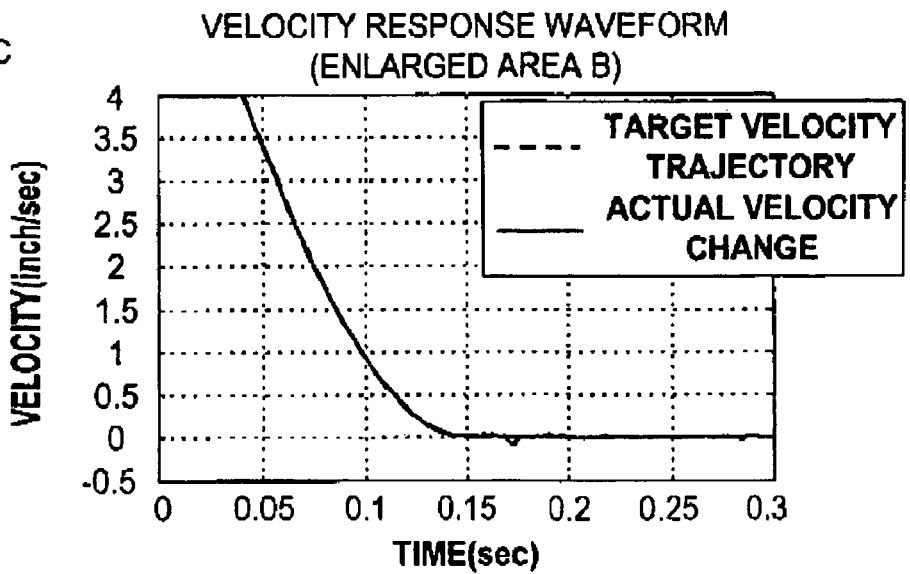

FIGS. 8A to 8C show velocity response waveforms of the control target (the conveyor roller 41) when the motor 10 is driven by the operation amount u as described above, and thus when the conveyor roller 41 is driven. As clearly shown by a comparison of velocity response waveforms in FIGS. 8A to 8C and FIGS. 20A to 20C in the conventional case, the velocity response waveforms in the present embodiment show an improved responsiveness at a time of transition to a constant velocity driving area or at a stopping time, and also a smooth change following the target trajectory.

Figure 9A:
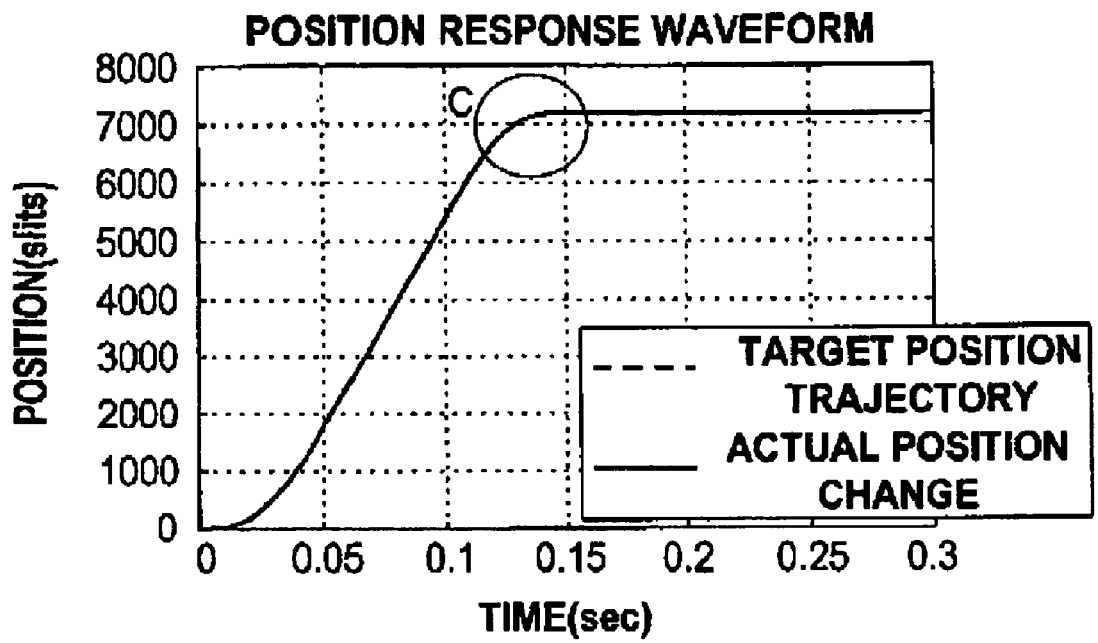
FIGS. 9A and 9B are graphs showing a position response when the operation amount in FIG. 7A is given to the control target.
Figure 9B:
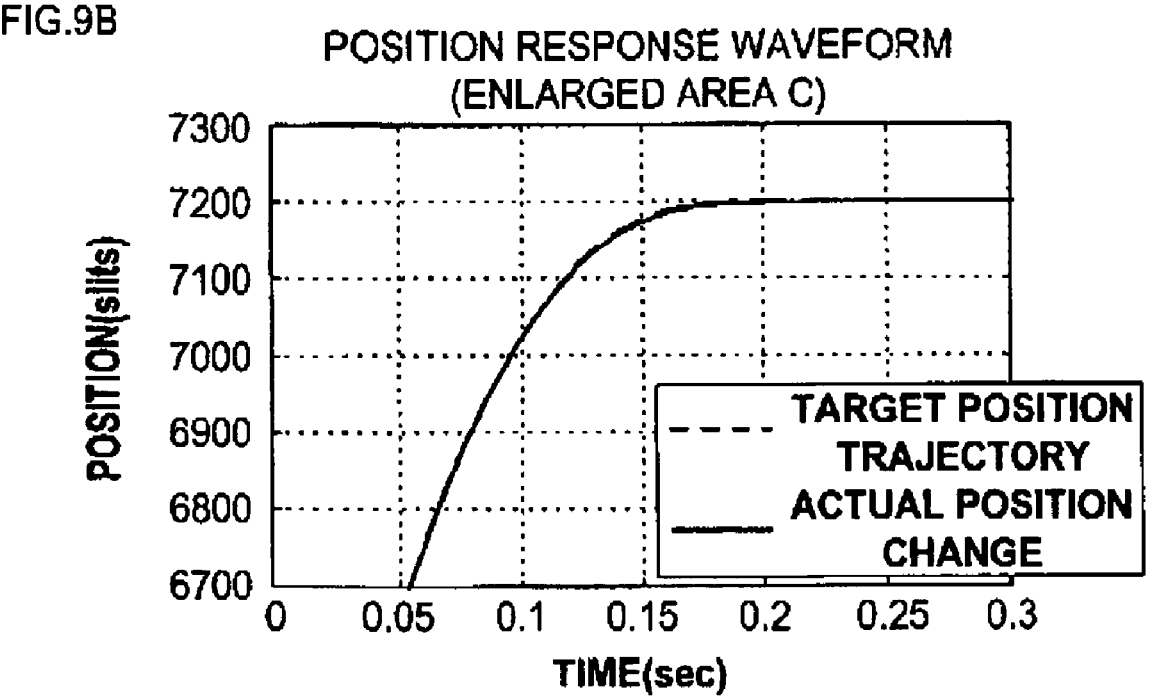
Figure 21A:
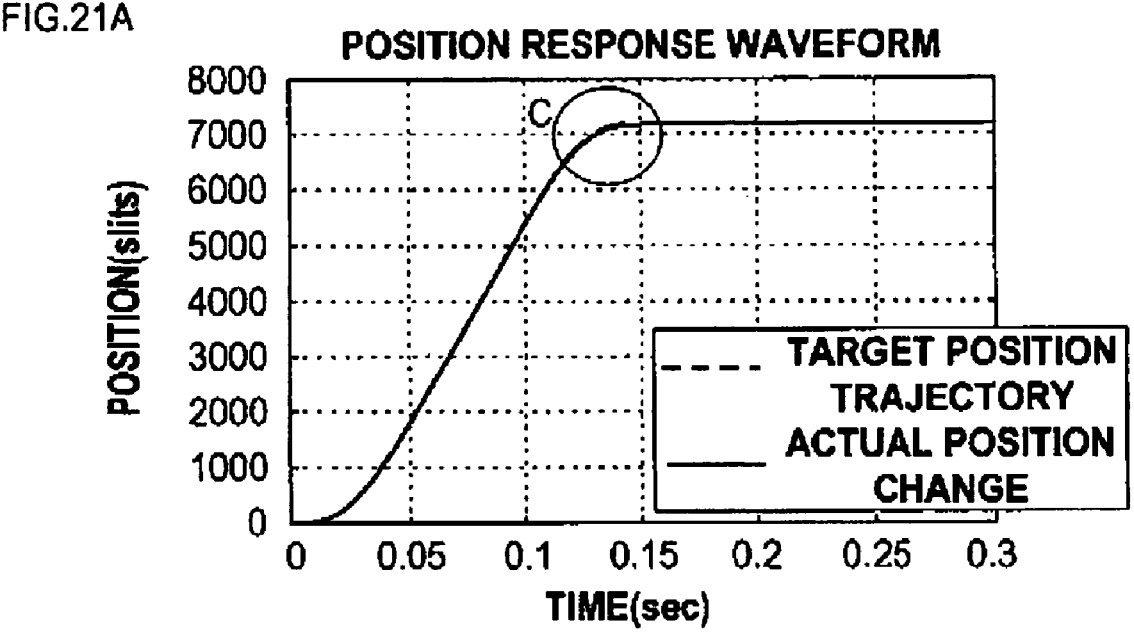
FIGS. 21A and 21B are graphs showing a position response when the operation amount in FIG. 19A is given to the control target.
Figure 21B:
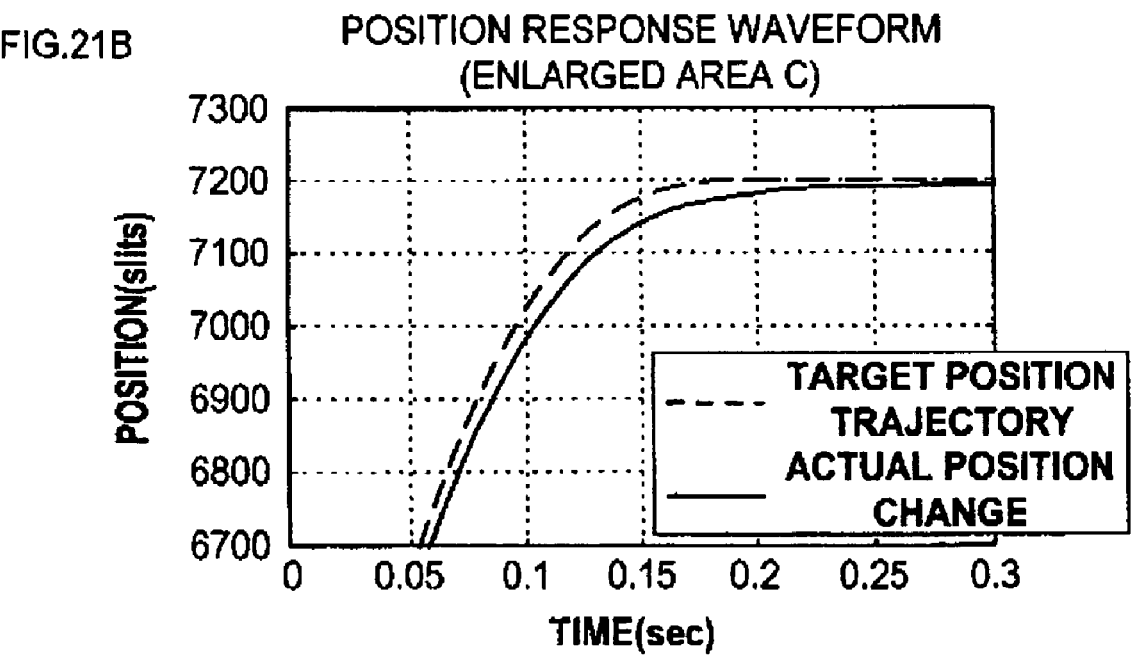

As a result, as shown by position response waveforms in FIGS. 9A and 9B, a change of the target position trajectory and a change of the actual position are substantially the same as each other. Specifically, a reaching time to a target destination position is considerably shortened as clearly shown by a comparison with position response waveforms in FIGS. 21A and 21B in the conventional case.

Figure 10:
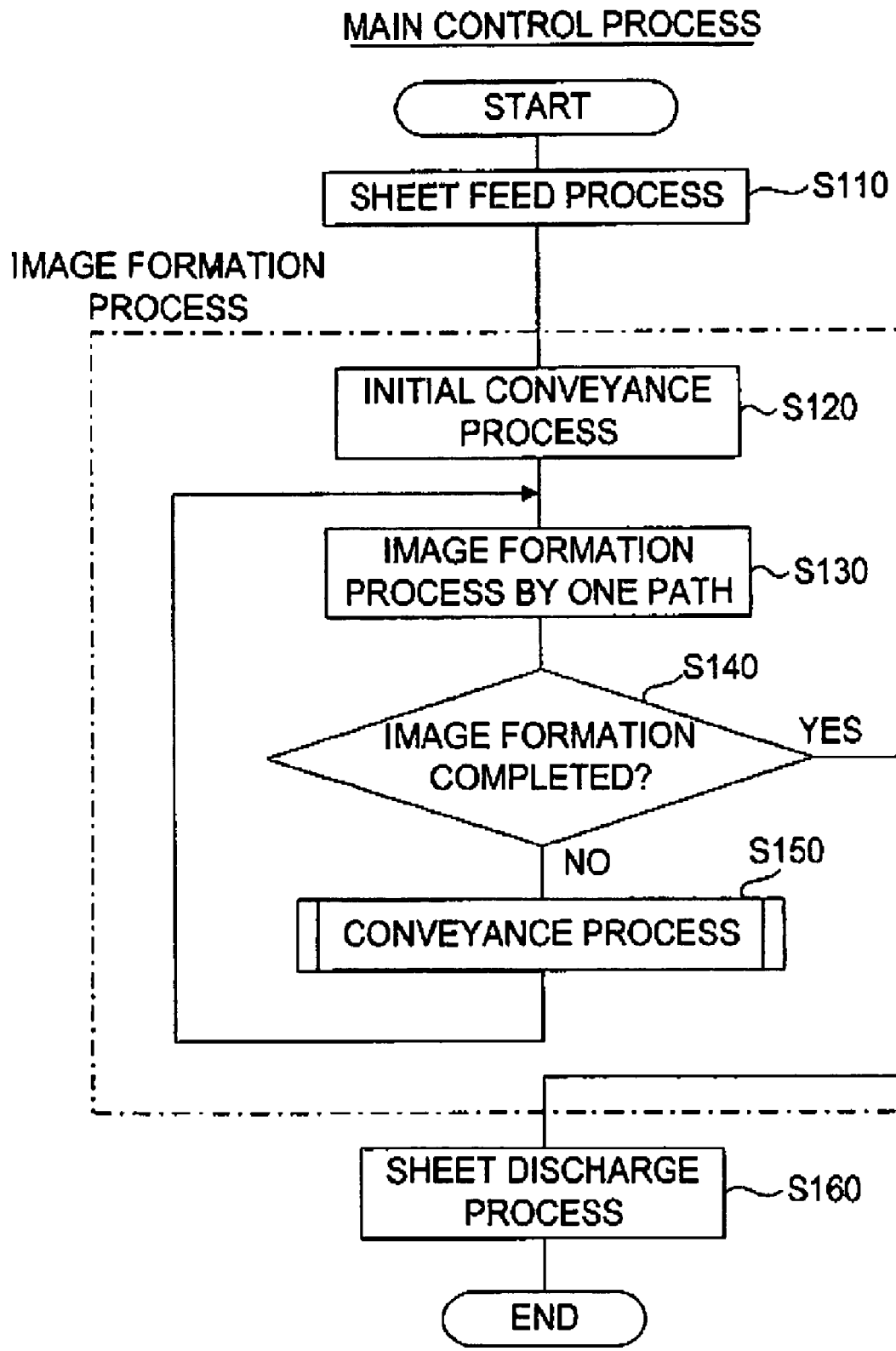
FIG. 10 is a flowchart showing a main control process executed by a CPU.

A main control process executed by the CPU 51 will now be described. In the present multi-function apparatus 1, the main control process includes a sheet feed process, an image formation process, a sheet discharge process, etc. The main control process shown by the flowchart in FIG. 10 is executed by the CPU 51 when an image formation command (for example an image formation command for one job) is input from a personal computer (PC) connected to the multi-function apparatus 1, the operation panel 29, or the like to the CPU 51.

When the main control process is started, the CPU 51 performs setting of registers related to a sheet feed operation to the ASIC 52 (S110). As a result, a process related to the sheet feed operation is performed in the ASIC 52, while the sheet P is conveyed to a register position in the conveyance unit 40 (a sheet feed process). When the sheet feed process is completed, the image formation process is then performed.

When the image formation process is started, the CPU 51 performs an initial conveyance process, in which a starting point of a drawing area of the sheet P is conveyed to a specified image forming position under a control of the ASIC 52 (S120). When the process in S120 is completed, the CPU 51 performs the image formation process by one path, the carriage 17 operates in the main scanning direction, and the recording head 15 ejects ink, and thereby an image by one path is formed on the sheet P (S130).

When the process in S130 is completed, the CPU 51 determines whether or not image formation up to an end point of the sheet P has been completed (S140). When it is determined that image formation up to the end point has not been completed (S140: NO), the CPU 51 performs a conveyance process (S150) to convey an area for a next path to a specified image forming area. Then, the present process returns to S130, and an image formation process for one path is performed.

When it is determined that image formation up to the end point has been completed (S140: YES), the CPU 51 performs the sheet discharge process, in which the sheet P is discharged under the control of the ASIC 52 (S160).

Figure 11:
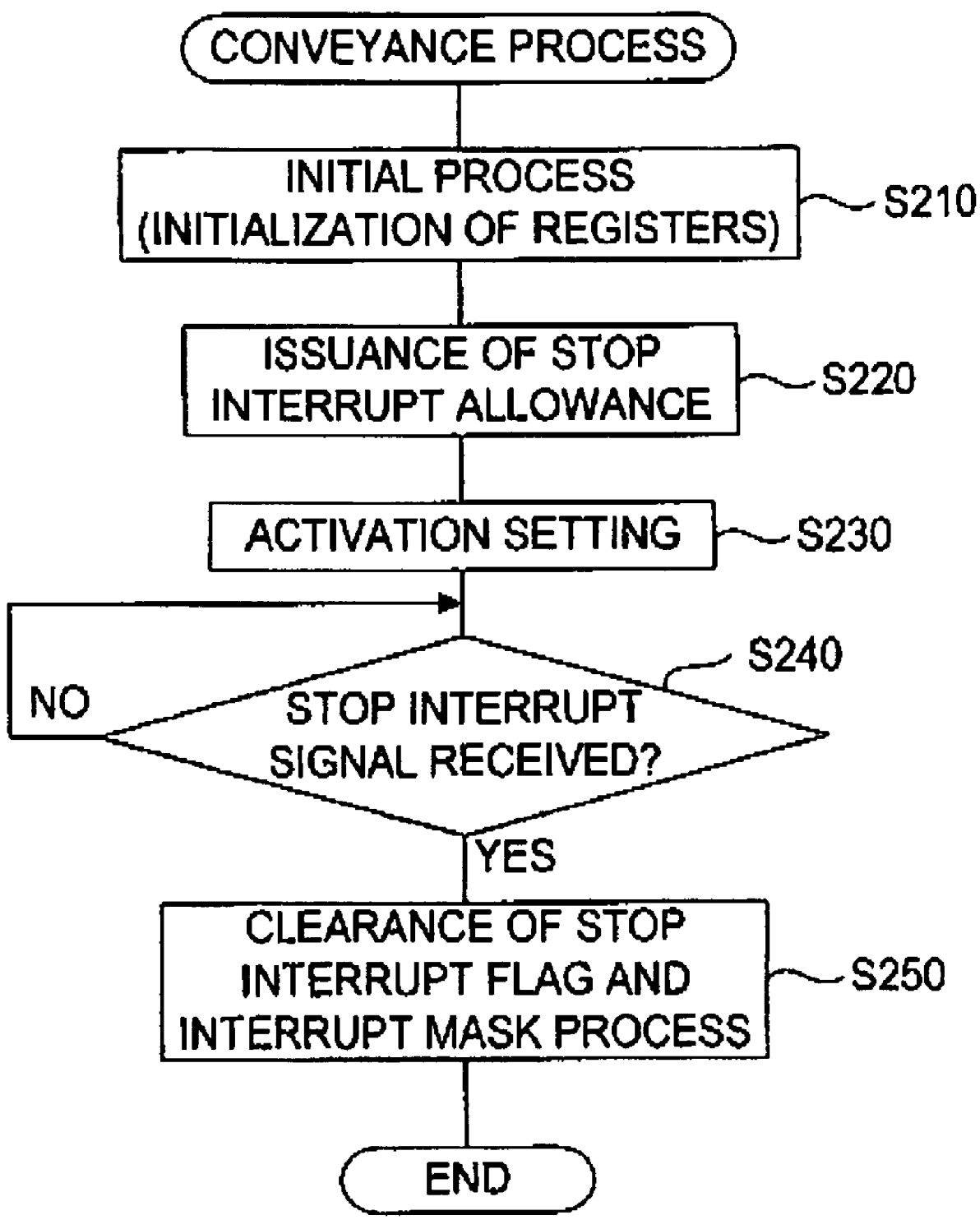
FIG. 11 is a flowchart showing details of a conveyance process in S150 in the main control process of FIG. 10.

In the conveyance process in S150, shown by a flowchart in FIG. 11, an initial process to the ASIC 52 is first performed (S210). In the initial process, setting or the like of registers constituting the group of operation mode setting registers 55 is performed.

When the process in S210 is completed, the CPU 51 issues a stop interrupt allowance to the ASIC 52 (S220). Thus, the ASIC 52 is enabled to output a stop interrupt signal.

Each time the sheet P stops at a target stopping position set in a not-shown target stopping position setting register as a result of conveyance control by one path, the ASIC 52, which has received the stop interrupt allowance, detects the state by the various-signal processing unit 65, and inputs a stop interrupt signal to the CPU 51.

When the process in S220 is completed, the CPU 51 performs an activation setting to the ASIC 52 (S230). Specifically, in S230, upon setting of the activation register 71 by the CPU 51, calculation of the operation amount u or the like is started in the ASIC 52. Also, the driving of the motor 10 and thus the sheet conveyance by one path by rotational driving of the conveyor roller 41 and the discharge roller 43 is started. Control of the motor 10 to be started after the activation setting (i.e., the conveyance control by one path) is basically performed by the ASIC 52, while the CPU 51 waits for reception of the stop interrupt signal in S240.

When the stop interrupt signal is output from the ASIC 52, the CPU 61 clears a stop interrupt flag, and performs an interrupt mask process regarding a stop interrupt to avoid further reception of a stop interrupt signal (S250). Upon reception of the stop interrupt signal, the CPU 51 performs an image formation process for one path as described above (S130).

A description will now be presented on a method for calculating the first parameter a, the second parameter b and the FF correction coefficient Gc to be used when the FF correction value generation unit 90 generates the current feed-forward correction value.

As described above, during the regular driving mode at the time of image formation, the CPU 51 sets the regular driving mode by setting "1" in the calculation mode register 82 in the group of operation mode setting registers 55.

At the time of calculating the parameters a and b and the coefficient Gc, the CPU 51 sets the feed-forward correction value calculation mode by setting "0" in the calculation mode register 82.

Since "0" is input to the multiplier 112 in the feed-forward correction value calculation mode, the output correction value H from the second adder 110 is not output to outside. That is, the current feed-forward correction value is zero. In this case, the current feed-forward command value from the FF command generation unit 87 is combined, without any correction, with the feed-back compensation amount to obtain the operation amount u.

Then, by examining a feed-back compensation amount when driving the control target based on the operation amount u, a required amount of correction of the current feed-forward command value is calculated. That is, the values of the first parameter a, the second parameter b and the FF correction coefficient Gc to be used by the FF correction value generation unit 90 are calculated. The calculation is performed by a correction parameter calculation unit (a current feed-forward value correction parameter calculation unit) 101 (actually software) in the CPU 51.

Setting of the feed-forward correction value calculation mode by setting "0" in the calculation mode register 82 may be performed, for example, before shipment from a factory where the multi-function apparatus 1 is manufactured, or at predetermined time intervals (e.g. every several months, or every several days). The setting may also be performed when a temperature change from a temperature at a time of activation of the multi-function apparatus 1 exceeds a predetermined threshold (in other words, when a temperature change is substantial), or when various maintenance operations, such as replacement of a cartridge, are performed on the multi-function apparatus 1.

At the time of calculating the values a, b, and Gc by the correction parameter calculation unit 101 in the CPU 51, calculation of the first parameter a and the second parameter b is first performed.

Specifically, in order to obtain a relational expression (a function) between the velocity during the constant velocity driving and the feed-back compensation amount when the driving velocity of the control target is constant, velocities Vi for constant velocity driving are first set in the velocity register 76 in the group of operation mode setting registers 55. Then, the control target is driven at each of the velocities Vi for constant velocity driving to obtain a feed-back compensation amount Ifbc during the constant velocity driving at the each of the velocities Vi for constant velocity driving.

Obtainment of the feed-back compensation amount Ifbc is performed based on the feed-back compensation amount which is input from the filter unit 91 to the CPU 51 after cutting of the high-frequency component.

Figure 12A:
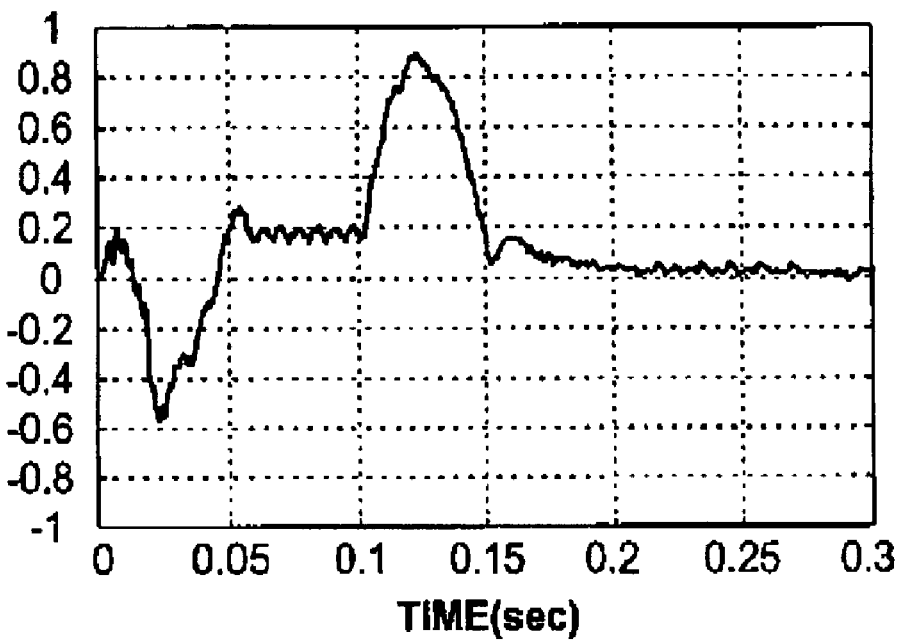
FIGS. 12A and 12B are graphs for illustrating that a high-frequency component of a feed-back correction amount is cut by a filter unit.
Figure 12B:
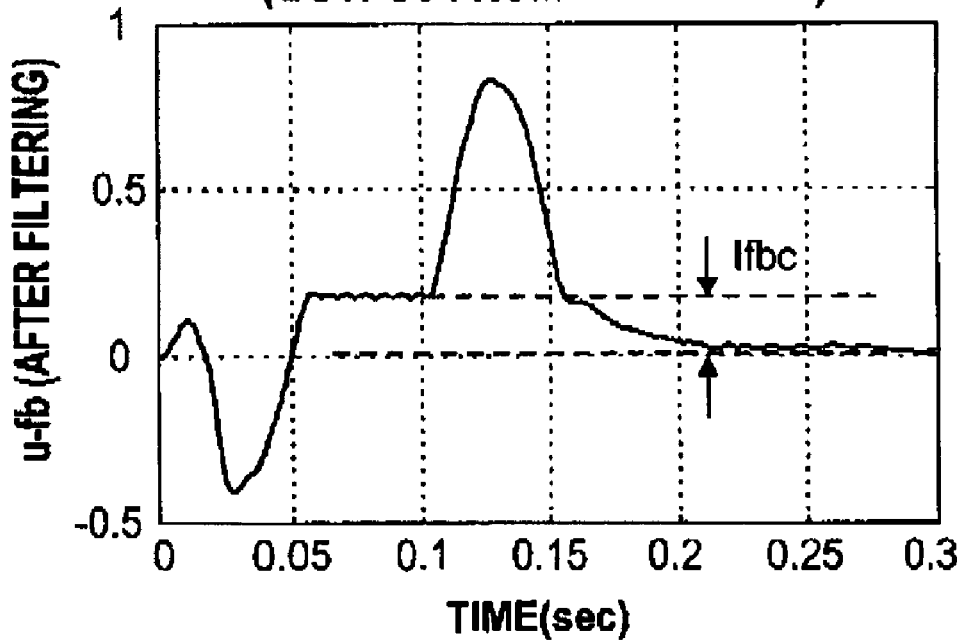

FIG. 12A shows output from the feed-back control unit 88 in the feed-forward correction value calculation mode. Since the feed-back compensation amount generated by the feed-back control unit 88 includes the high-frequency component, as shown in FIG. 12A, the feed-back compensation amount during the constant velocity driving (0.05-0.1 sec.) cannot easily be obtained. Accordingly, the feed-back compensation amount Ifbc is obtained by cutting of the high-frequency component by the filter unit 91, as shown in FIG. 12B. Obtainment of the feed-back compensation amount Ifbc during the constant velocity driving is performed at each of the plurality of velocities Vi for constant velocity driving.

Figure 13:
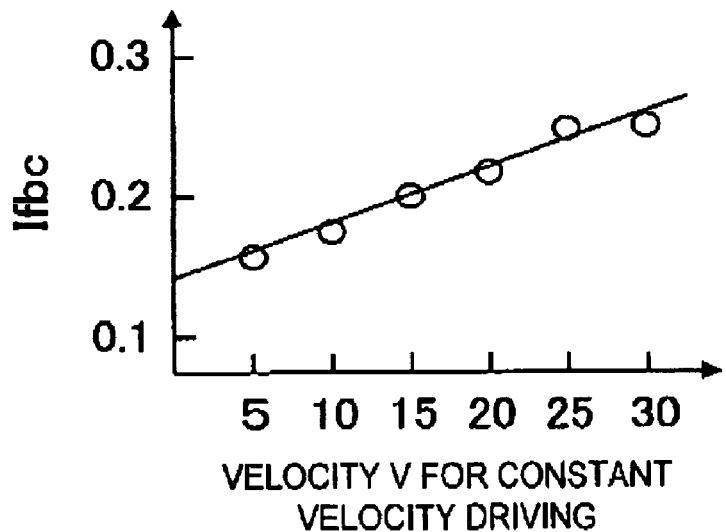
FIG. 13 is a graph showing a relationship between a velocity and a feed-back compensation amount during a constant velocity driving.

The relational expression between the velocity V for constant velocity driving and the feed-back compensation amount Ifbc is obtained based on the feed-back compensation amount Ifbc at each of the velocities Vi for constant velocity driving obtained as above. FIG. 13 shows that feed-back compensation amounts Ifbc at six velocities V for constant velocity driving are plotted on a V-Ifbc coordinate, with the result that the relationship between V and Ifbc is indicated by a linear function. As shown by FIG. 13, the feed-back compensation amount Ifbc can be obtained by performing a linear conversion of the velocities V for constant velocity driving.

The linear function, which indicates the relationship between V and Ifbc and is represented by a linear line in FIG. 13, is first obtained. Then, an inclination (or a rate of change) of the obtained linear function is set as the first parameter a corresponding to the viscous friction of the control target. Also, an intercept of the linear function (a constant term) is set as the second parameter b corresponding to the coulomb friction of the control target.

As already described above, the friction correction amount y1 generated by the FF correction value generation unit 90 in the control unit 57 is obtained by the calculation of y1=a·v+b. This function is exactly equivalent to the function of Ifbc=a·V+b which indicates the linear line in FIG. 13. When focus is only on a viscous friction correction amount in the friction correction amount y1, a function expression of "viscous friction correction amount=a·v" is valid.

Figure 14:
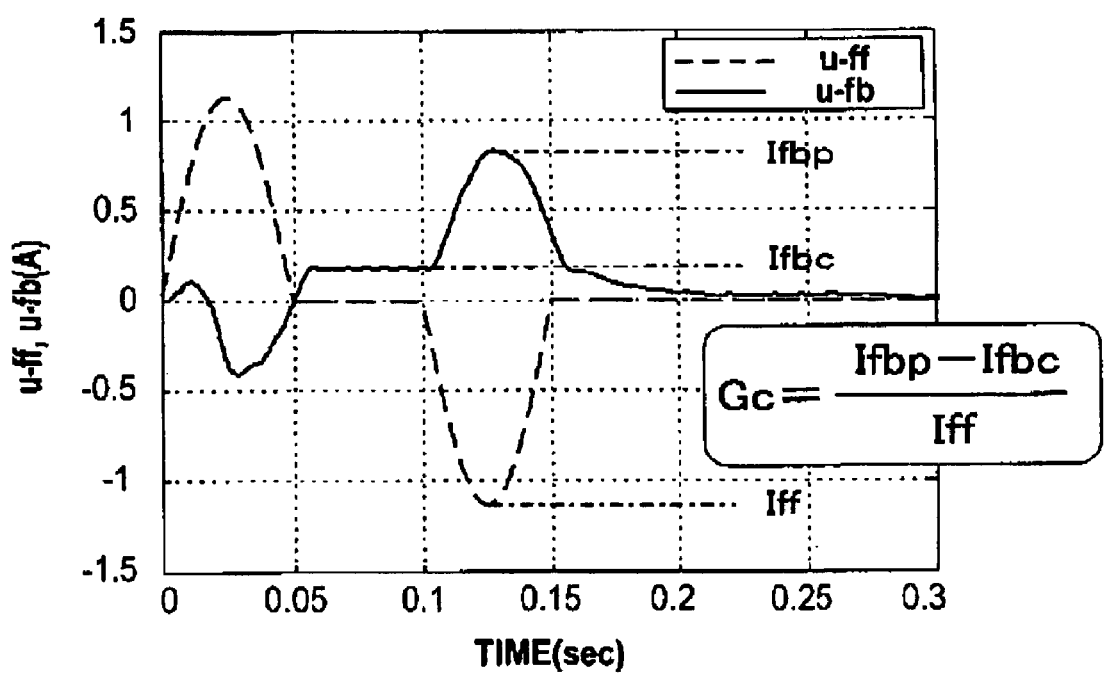
FIG. 14 is a graph for illustrating a calculation method of a current feed-forward value correction coefficient Gc.

Calculation of the FF correction coefficient Gc performed by the CPU 51 will next be described with reference to FIG. 14. FIG. 14 shows the current feed-forward command value u-ff and the feed-back compensation amount u-fb in the feed-forward correction value calculation mode. Calculation of the FF correction coefficient Gc is performed by calculating a ratio of the feed-back compensation amount to the current feed-forward command value.

In the present embodiment, a waveform of the current feed-forward command value and a waveform of the feed-back compensation amount have an approximately similar relationship in the deceleration time as shown in FIG. 14. Accordingly, a ratio of peak values of the both waveforms is calculated and used as the FF correction coefficient Gc. The peak value here means a peak value in amplitude of each of the waveforms.

Since the current feed-forward command value is a previously designed operation amount, a peak value Iff thereof is also specified. A peak value (a peak value in amplitude) of the feed-back compensation amount generated by an actual compensation amount 88 when the control target is driven by the current feed-forward command value is obtained by subtracting the feed-back compensation amount Ifbc during the constant velocity driving from a peak value Ifbp of an actual feed-back compensation amount, based on the output waveform from the filter unit 91.

Accordingly, the FF correction coefficient Gc can be obtained according to the following formula (1):

$$Gc=(Ifbp-Ifbc)/Iff \qquad (1)$$

After the calculation of the first parameter a, the second parameter b and the FF correction coefficient Gc, the CPU 51 stores the calculated values in the not-shown EEPROM. The stored latest values a, b, and Gc will be used by the FF correction value generation unit 90 when the motor 10 is driven after the feed-forward correction value calculation mode is cancelled and the regular driving mode returns.

Figure 15:
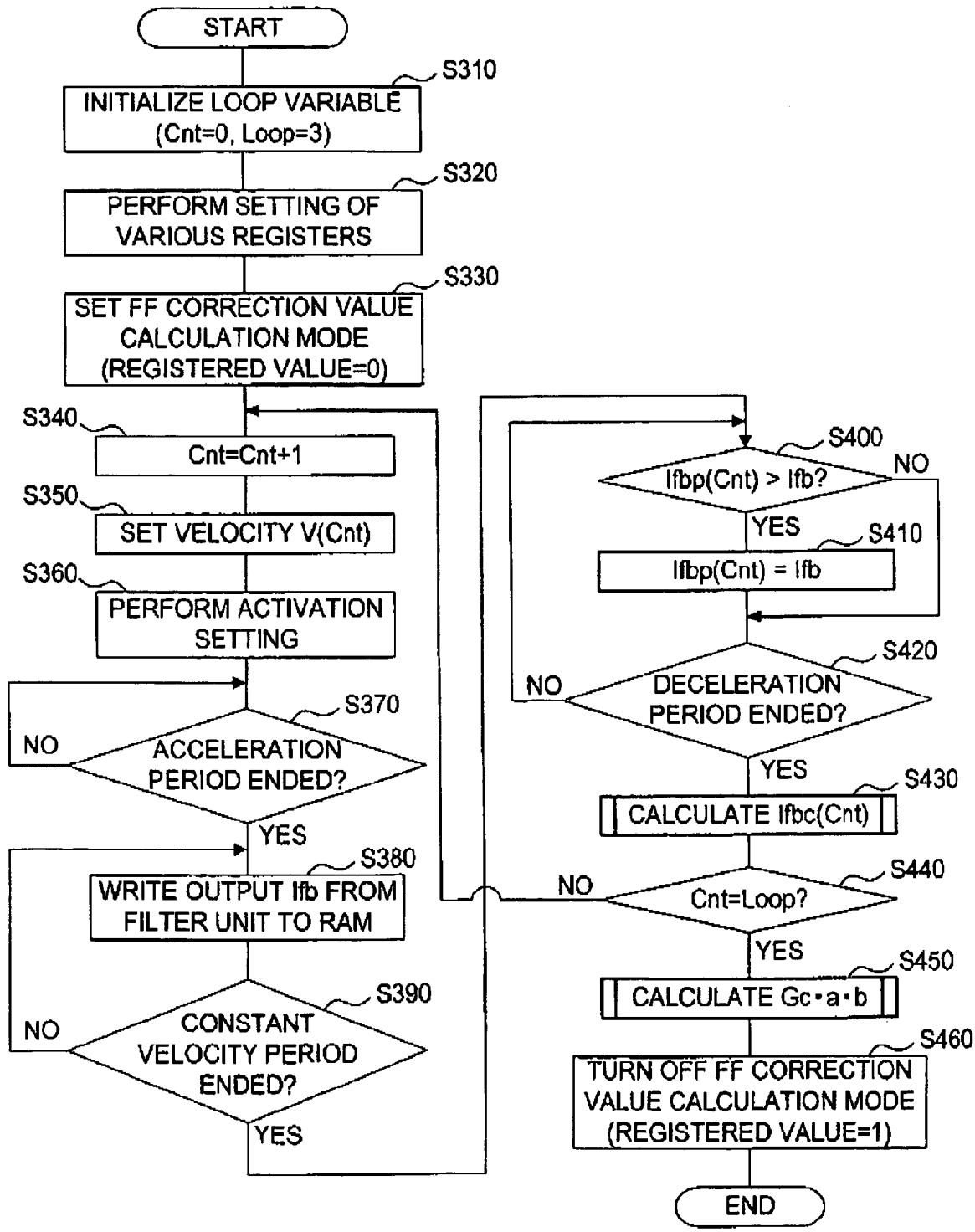
FIG. 15 is a flowchart showing a correction value parameter calculation process executed by the CPU.

A description will now be provided of the correction value parameter calculation process performed by the CPU 51 in order to calculate the first parameter a, the second parameter b, and the FF correction coefficient Gc as above, with reference to FIG. 15. The correction value parameter calculation process is performed appropriately at various timings, such as before shipment of the multi-function apparatus 1 from a factory or at predetermined time intervals (e.g. every several months, or every several days) as exemplarily mentioned above.

When the process is started, a loop variable is first initialized (S310). Specifically, setting of a variable Loop and a variable Cnt is performed. The variable Loop indicates a number of loops or a number of drivings of the motor 10 (and thus the conveyor roller 41) at the plurality of velocities Vi for constant velocity driving, i.e., a number of levels of velocities for constant velocity driving, in order to calculate a, b, and Gc. The variable Cnt to count the number is set to 0. In the present embodiment, one example of driving at three levels of velocities V(1), V(2), and V(3) for constant velocity driving (i.e., Loop=3 in S310) will be described below in detail.

After the loop variable is initialized, setting of various registers in the group of operation mode setting registers 55 is performed (S320). Then, "0" is set in the calculation mode register 82 to set to the feed-forward correction value calculation mode (S330), and the variable Cnt is incremented by 1 (S340).

Subsequently, a velocity V(Cnt) for constant velocity driving is set in the velocity register 76 (S350). In an initial process with Cnt=1, a velocity V(1) for constant velocity driving is set. Then, an activation setting to the ASIC 52 is performed (S360).

It is determined whether or not an acceleration period has ended (S370). When it is determined that the acceleration period has ended and a constant velocity period has started (S370: YES), an output value Ifb from the filter unit 91 is written to the RAM 54 (S380).

Then, it is determined whether or not the constant velocity period has ended (S390). Until the constant velocity period has ended, a processing in S380, i.e., writing of the value Ifb to the RAM 54, is repeatedly performed.

When the constant velocity period has ended and a deceleration period has started, it is then determined whether or not a peak value Ifbp(Cnt) of the feed-back compensation amount in a present loop (beginning with a first loop) is larger than a present feed-back compensation amount Ifb (S400).

The peak value Ifbp(Cnt), which is temporarily written to the RAM 54 by a processing in S410, is updated in accordance with an increase of the feed-back compensation amount while the feed-back compensation amount increases after deceleration is started. Once the feed-back compensation amount hits a peak in the deceleration period, the feed-back compensation amount becomes smaller than the peak value Ifbp(Cnt) written in the RAM 54. In other words, the peak value Ifbp(Cnt) of the feed-back compensation amount is kept stored in the RAM 54.

Figure 16:
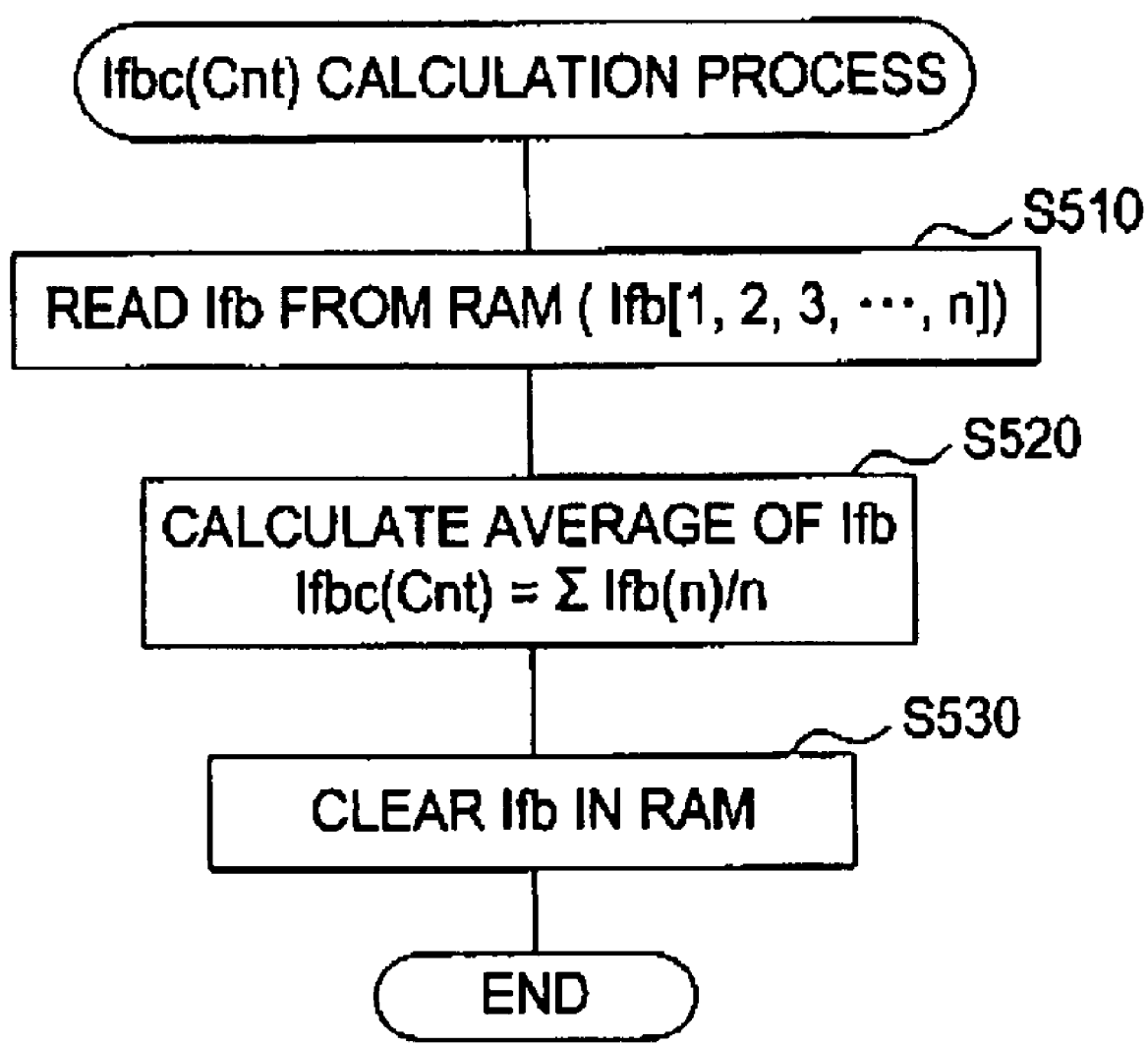
FIG. 16 is a flowchart showing an Ifbc(Cnt) calculation process in S430 in the correction value parameter calculation process of FIG. 15.

When it is determined that the deceleration period has ended (S420: YES), a calculation process of a feed-back compensation amount Ifbc(Cnt) during a constant velocity driving period in the present loop is performed (S430). The Ifbc(Cnt) calculation process is specifically shown in FIG. 16.

First, reading feed-back compensation amounts Ifb (Ifb(1), Ifb(2), ..., Ifb(n)) written in the RAM 54 is performed (S510). The feed-back compensation amounts Ifb are written in the RAM 54 by the repeatedly performed processing in S380.

An average of the feed-back compensation amounts Ifb read in S510 is calculated, as the feed-back compensation amount Ifbc(Cnt) during the constant velocity driving period in the present loop is obtained (S520). Once the feed-back compensation amount Ifbc(Cnt) is obtained, the feed-back compensation amounts Ifb written in the RAM 54 in S380 are all cleared (S530). Thus, the feed-back compensation amount Ifbc at the velocity V(1) for constant velocity driving is obtained, and one point can be plotted in FIG. 13.

After the feed-back compensation amount Ifbc(Cnt) is calculated in S430, it is determined whether or not Cnt=Loop, that is, a same number of constant velocity drivings as the number of loops set in S310 (3 in the present embodiment) have been completed (S440). When Cnt=1, that is, a first loop has just completed, processings in and after S340 are performed again. Specifically, Cnt is incremented by 1 (S340) to Cnt=2, and processings in and after S350 are performed. That is, a feed-back compensation amount Ifbc at the velocity V(2) for constant velocity driving is calculated in a second loop.

In the above described manner, the control target is driven at the three levels of velocities V(1), V(2) and V(3) for constant velocity driving, and feed-back compensation amounts Ifbc(1), Ifbc(2) and Ifbc(3) at the respective velocities, as well as respective peak values Ifbp(1), Ifbp(2) and Ifbp(3) are obtained (S440: YES).

Subsequently, calculation of a first parameter a, a second parameter b and a FF correction coefficient Gc (calculation of Gc·a·b) is performed (S450).

Figure 17:
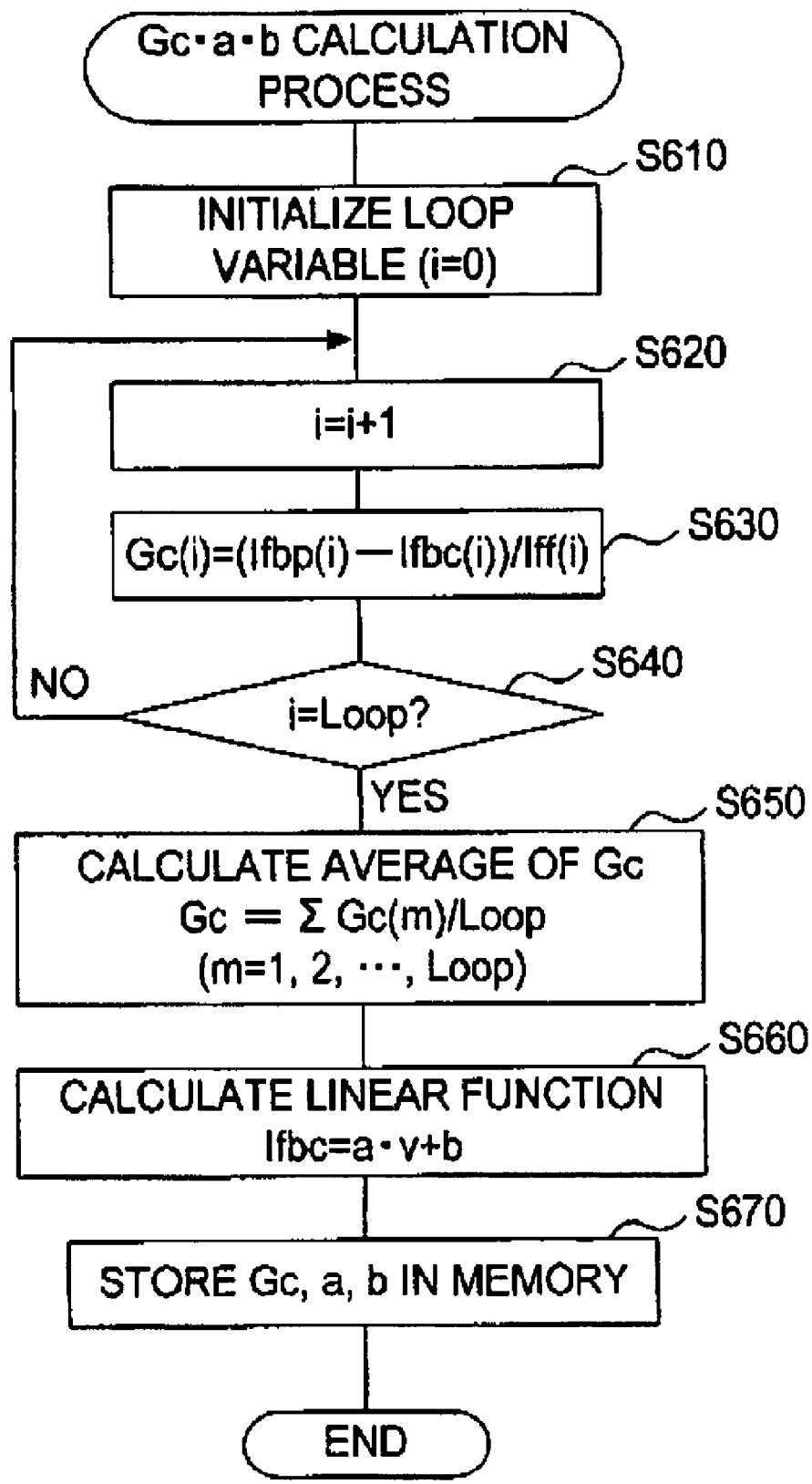
FIG. 17 is a flowchart showing a Gc·a·b calculation process in S450 in the correction value parameter calculation process of FIG. 16.

The calculation of Gc·a·b in S450 is specifically as shown in FIG. 17. First, a loop variable i in the present process is first initialized (i.e., set to 0) (S610). Then, the loop variable i is incremented by 1 (S620), and Gc(i) is calculated using the above-mentioned formula (1) (S630). In a first process in which i=1, Gc(1) is calculated. Specifically, Gc(1) is obtained by performing calculation of Gc(1)={Ifbp(1)−Ifbc(11)}/Iff (1).

Subsequently, it is determined whether or not the calculation of Gc has been performed the same times as the number of loops (Loop=3) (S640). Until the number of the calculations of Gc has reached the number of loops, the present process returns to S620 and the calculation of Gc (S630) is repeated. As a result, the same number of Gc as the number of loops are obtained. In the present embodiment, Gc(1), Gc(2) and Gc(3) are obtained.

An average of the plurality of Gc(i) is calculated to obtain a FF correction coefficient Gc (S650). Then, calculation of a linear function Ifbc=a·v+b is performed. The linear function Ifbc=a·v+b indicates a relationship between the already obtained three levels of velocities V(m) (m=1, 2, ..., Loop) for constant velocity driving and feed-back compensation amounts Ifbc(m) (m=1, 2, ..., Loop) at the respective velocities for constant velocity driving (S660). The calculation of the linear function can be performed in various manners.

The first parameter a, the second parameter b, and the FF correction coefficient Gc obtained in S650 and S660 are stored (overwritten) as the latest values in the EEPROM (S670).

After the calculation of Gc·a·b in S450 is performed, the feed-forward correction value calculation mode is turned off by setting "1" in the calculation mode register 82 and thereby the regular driving mode is turned on (S460).

According to the multi-function apparatus 1 in the above-described embodiment, in a two-degree-of-freedom system control to drive a control target by an operation amount obtained by adding the feed-back compensation amount from the feed-back control unit 88 to the current feed-forward command value from the FF command generation unit 87, the FF correction value generation unit 90 is provided. The current feed-forward command value is corrected by the current feed-forward correction value from the FF correction value generation unit 90.

The current feed-forward correction value is obtained by adding the friction correction amount y1 and the parameter correction amount y2. The friction correction amount y1 is to suppress occurrence of an error between the target movement amount and the actual movement amount due to the friction on the control target. The parameter correction amount y2 is to suppress occurrence of an error between the target movement amount and an actual movement amount due to the errors in mechanical parameters of the control target.

As a result, the current feed-forward command value is corrected by a correction value considering a friction actually acting on the control target and the actual mechanical parameters. Also, a difference between a target movement amount and an actual movement amount of the control target based on the corrected current feed-forward command value can be reduced. Therefore, an increase in the operation amount by feed-back drive control (the feed-back compensation) is suppressed, resulting in enhanced followability and responsiveness in feed-forward control.

The friction correction amount y1 to suppress occurrence of a friction error is obtained considering both a viscous friction depending on a velocity and a coulomb friction not depending on a velocity. It may, therefore, be possible to securely attain an advantage of enhanced followability and responsiveness in feed-forward control, which results from correction of the current feed-forward command value so as to suppress occurrence of a friction error.

The parameter correction value y2, which is obtained by multiplying the current feed-forward command value by the FF correction coefficient Gc, corresponds to a magnitude of the current feed-forward command value. It may, therefore, be possible to securely attain an advantage of enhanced followability and responsiveness in feed-forward control, which results from correction of the feed-forward operation amount so as to suppress occurrence of a parameter error.

Also, calculation of the friction correction amount y1 is based on a previously obtained function (a linear function indicating the relationship between a velocity and the friction correction amount y1) so that a value corresponding to a target velocity of the control target is output from the first adder 106. Accordingly, an appropriate friction correction amount y1 corresponding to the target velocity at any given time can be obtained throughout an entire driving time of the control target, and thus followability and responsiveness in feed-forward control can sufficiently be maintained.

Since the previously obtained function is a simpler linear function, the friction correction amount y1 can be obtained more easily. Accordingly, the FF correction value generation unit 90 for calculating the friction correction amount y1 may have a simplified configuration.

Further, calculation of the first parameter a, the second parameter b and the FF correction coefficient Gc to be used for generating the current feed-forward correction value is performed based on a feed back compensation amount when the control target is driven at a plurality of constant velocities while the feed-forward correction value calculation mode is on. Accordingly, more appropriate values in accordance with a state of the control target at any given time can be obtained. It may, therefore, be possible to attain an improved control performance of feed-forward control by correcting the current feed-forward command value by the current feed-forward correction value obtained using the values a, b, Gc calculated as above, It is to be understood that the present invention should not be limited to the above-described embodiment, but may be embodied in various forms without departing from the spirit and scope of the present invention.

For example, the calculation of the friction correction amount y1 is performed by multiplying the target velocity trajectory (i.e., the target velocity at each specified timing) by the first parameter a in the viscous friction correction amount calculator 105 in the above-described embodiment. However, the calculation may be performed by inputting the velocity Vi for constant velocity driving set in the velocity register 76 instead of the target velocity trajectory to the viscous friction correction amount calculator 105.

In this case, although control performance may be slightly deteriorated in the acceleration period or the deceleration period, generally great control performance may be attained. However, it may be preferable to calculate the friction correction amount y1 based on the target velocity trajectory, in order to attain an improved control performance throughout the entire period, including the acceleration period and the deceleration period.

A linear function is employed as the function indicating the relationship between the velocity V for constant velocity driving and the feed-back compensation amount Ifbc at the velocity V for constant velocity driving when the CPU 51 calculates the friction compensation parameters a, b in the above-described embodiment. However, the linear function is merely an example, and a quadratic function or a more complex function may be employed. In this case, the control target may be driven at a number of velocities V for constant velocity driving more than the degrees of the function to obtain a function based on each feed-back compensation amount Ifbc at each of the velocities V for constant velocity driving.

Further, the current feed-forward command value is corrected by the current feed-forward correction value obtained by adding the friction correction amount y1 and the parameter correction amount y2 in the above-described embodiment. However, the current feed-forward correction value may be only one of the friction correction amount y1 and the parameter correction amount y2.

What is claimed is:
1. A drive control apparatus comprising:
a feed-forward operation amount generation device that generates a feed-forward operation amount which corresponds to a target trajectory in order to drive a control target along the target trajectory;
a feed-back operation amount generation device that compares a target value in accordance with the target trajectory and an actual movement amount of the control target, and
generates a feed-back operation amount as an operation amount corresponding to an error between the target value and the actual movement amount so as to minimize the error;
a feed-forward correction amount generation device that generates a feed-forward correction amount for correcting the feed-forward operation amount so as to minimize the error between the target value and the actual movement amount; and
a feed-forward operation amount correction device that corrects the feed-forward operation amount by adding the feed-forward correction amount to the feed-forward operation amount,
wherein the drive control apparatus is configured to input an input operation amount, which is obtained by adding the feed-back operation amount to the feed-forward operation amount corrected by the feed-forward operation amount correction device, into the control target thereby to drive the control target.

2. The drive control apparatus according to claim 1,
wherein the feed-forward correction amount generation device includes a friction correction amount generation device that generates a friction correction amount for correcting the feed-forward operation amount so as to suppress occurrence of a friction error due to a friction acting on the control target in the error between the target value and the actual movement amount, and
wherein the feed-forward operation amount correction device corrects the feed-forward operation amount by adding at least the friction correction amount to the feed-forward operation amount.

3. The drive control apparatus according to claim 2, wherein the friction acting on the control target includes at least one of a viscous friction depending on a driven velocity of the control target and a dynamic friction not depending on the driven velocity.

4. The drive control apparatus according to claim 2, wherein the friction correction amount generation device includes:
   a viscous friction correction amount calculation device that calculates a viscous friction correction amount used to suppress occurrence of a viscous friction error due to a viscous friction depending on a driven velocity of the control target in the friction error; and
   a friction correction amount calculation device that calculates a friction correction amount by adding the viscous friction correction amount to a dynamic friction correction amount which is predetermined to suppress occurrence of a dynamic friction error due to a dynamic friction not depending on the driven velocity in the friction error.

5. The drive control apparatus according to claim 4, wherein the viscous friction correction amount calculation device calculates the viscous friction correction amount corresponding to a target velocity of the control target based on a previously obtained viscous friction function indicating a relationship between a velocity of the control target and the viscous friction correction amount.

6. The drive control apparatus according to claim 5, wherein the viscous friction correction amount calculation device calculates the viscous friction correction amount corresponding to a target velocity trajectory as the target trajectory based on the viscous friction function.

7. The drive control apparatus according to claim 5, wherein the viscous friction function is a linear function.

8. The drive control apparatus according to claim 5, further comprising a friction-related calculation device that performs obtainment of the viscous friction function and the dynamic friction correction amount.

9. The drive control apparatus according to claim 8, further comprising:
   a performing mode setting device that stops an operation of the feed-forward operation amount correction device thereby to set the drive control apparatus in a performing mode for performing the obtainment by the friction-related calculation device,
   wherein the friction-related calculation device is configured to perform the obtainment when the drive control apparatus is set in the performing mode by the performing mode setting device.

10. The drive control apparatus according to claim 9, wherein the friction-related calculation device includes:
    a constant velocity driving device that makes the feed-forward operation amount generation device generate the feed-forward operation amount corresponding to each of a number of target velocities at least more than degrees of the viscous friction function thereby to perform constant velocity driving of the control target at the each of the target velocities; and
    a velocity-feed-back operation amount function obtaining device that obtains a velocity-feed-back operation amount function indicating a relationship between a velocity during a constant velocity driving and the feed-back operation amount based on the feed-back operation amount at the each of the target velocities, which is generated by the feed-back operation amount generation device when constant velocity driving of the control target is performed by the constant velocity driving device, and wherein a constant part of the obtained velocity-feed-back operation amount function is determined as the dynamic friction correction amount and a non-constant part of the obtained velocity-feed-back operation amount function is determined as the viscous friction function.

11. The drive control apparatus according to claim 10, wherein the velocity-feed-back operation amount function is a linear function.

12. The drive control apparatus according to claim 1,
    wherein the feed-forward correction amount generation device includes a property change correction amount generation device that generates a property change correction amount for correcting the feed-forward operation amount so as to suppress occurrence of a property change error due to a change in a mechanical property of the control target in the error between the target value and the actual movement amount, and
    wherein the feed-forward operation amount correction device corrects the feed-forward operation amount by adding at least the property change correction amount to the feed-forward operation amount.

13. The drive control apparatus according to claim 12, wherein the mechanical property is a property which is related to at least one of a dimension, a shape and a hardness of the control target.

14. The drive control apparatus according to claim 12, wherein the property change correction amount generation device calculates the property change correction amount by multiplying the feed-forward operation amount generated by the feed-forward operation amount generation device by a predetermined property change compensation coefficient in accordance with a change amount of the mechanical property.

15. The drive control apparatus according to claim 14, further comprising a correction coefficient calculation device that performs calculation of the property change correction coefficient.

16. The drive control apparatus according to claim 15, further comprising:
    a performing mode setting device that stops an operation of the feed-forward operation amount correction device thereby to set the drive control apparatus in a performing mode for performing the calculation by the correction coefficient calculation device, and
    wherein the correction coefficient calculation device is configured to perform calculation of the property change correction coefficient when the drive control apparatus is set in the performing mode by the performing mode setting device.

17. The drive control apparatus according to claim 16,
    wherein the correction coefficient calculation device includes:
       a variable velocity drive device that makes the feed-forward operation amount generation device generate the feed-forward operation amount including a peak value thereby to perform variable velocity driving of the control target;
       a feed-back operation amount peak value obtaining device that obtains a peak value of the feed-back operation amount generated by the feed-back operation amount generation device when the control target is driven by the variable velocity drive device, and
       a peak ratio calculation device that calculates a ratio of the peak value obtained by the feed-back operation amount peak value obtaining device to the peak value of the feed- forward operation amount, and wherein the correction coefficient calculation device determines the ratio calculated by the peak ratio calculation device as the property change correction coefficient.

18. The drive control apparatus according to claim 17, wherein the variable velocity drive device makes the feed-forward operation amount generation device generate the feed-forward operation amount in order to perform deceleration driving of the control target from a state of constant velocity driving until a stopped state.

19. The drive control apparatus according to claim 1, wherein the feed-forward correction amount generation device includes:

a friction correction amount generation device that generates a friction correction amount for correcting the feed-forward operation amount so as to suppress occurrence of a friction error due to a friction acting on the control target in the error between the target value and the actual movement amount; and a property change correction amount generation device that generates a property change correction amount for correcting the feed-forward operation amount so as to suppress occurrence of a property change error due to a change in mechanical properties of the control target in the error between the target value and the actual movement amount, and wherein a feed-forward operation amount correction device corrects the feed-forward operation amount by adding at least the friction correction amount and the property change correction amount to the feed-forward operation amount.

20. The drive control apparatus according to claim 1, wherein the drive control apparatus is provided in an image forming apparatus for forming an image on a recording medium, and is configured to control a conveying apparatus provided in the image forming apparatus so as to convey the recording medium.

* * * * *